(12) United States Patent
Ghosh et al.

(10) Patent No.: US 8,965,089 B2
(45) Date of Patent: Feb. 24, 2015

(54) METHOD OF ANALYZING A MEDICAL IMAGE

(71) Applicant: Loma Linda University, Loma Linda, CA (US)

(72) Inventors: Nirmalya Ghosh, San Bernardino, CA (US); Stephen Ashwal, Riverside, CA (US); Andre Obenaus, Colton, CA (US); Bir Bhanu, Riverside, CA (US)

(73) Assignees: Loma Linda University, Loma Linda, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 14/272,299

(22) Filed: May 7, 2014

(65) Prior Publication Data

US 2014/0241608 A1     Aug. 28, 2014

Related U.S. Application Data

(63) Continuation of application No. 13/580,947, filed as application No. PCT/US2011/025943 on Feb. 23, 2011, now Pat. No. 8,731,261.

(60) Provisional application No. 61/307,396, filed on Feb. 23, 2010, provisional application No. 61/327,630, filed on Apr. 23, 2010.

(51) Int. Cl.
*G06K 9/00* (2006.01)
*G06K 9/34* (2006.01)
(Continued)

(52) U.S. Cl.
CPC .............. *G06T 7/0012* (2013.01); *G06T 7/0081* (2013.01); *G06K 9/3233* (2013.01);
(Continued)

(58) Field of Classification Search
CPC ................... G06T 7/0081; G06T 2207/20016; G06T 7/0012; G06T 2207/20021; G06T 2207/20064; G06T 5/00; G06T 7/0087; H04N 5/235; H04N 19/00357; G06K 9/3233; G06K 9/38; G06K 9/6251; G09G 2320/0271
See application file for complete search history.

(56) References Cited

U.S. PATENT DOCUMENTS 4,809,350 A * 2/1989 Shimoni et al. ............... 382/238
4,945,478 A * 7/1990 Merickel et al. ............. 382/131
(Continued)

OTHER PUBLICATIONS

Loma Linda University Medical Center et al., Written Opinion and International Search Report issued in corresponding International Patent Application PCT/US2011/025943 on May 20, 2011.
(Continued)

*Primary Examiner* — Manav Seth
(74) *Attorney, Agent, or Firm* — Knobbe, Martens, Olson & Bear, LLP

(57) ABSTRACT

A method of analyzing a medical image, where the medical image comprises one or more than one region of interest, and where the method comprises a) providing the medical image comprising a set of actual image values; b) rescaling the actual image values to produce corresponding rescaled image values and to produce a rescaled image from the rescaled image values; c) deriving a histogram of the rescaled image values; d) using the histogram to derive an adaptive segmentation threshold; e) using the adaptive segmentation threshold to recursively split the rescaled image; f) terminating the recursive splitting of the sub(sub) images using one or more than one predetermined criteria; and g) identifying one sub (sub) image in the terminated Hierarchical Region Splitting Tree which comprises the region of interest.

37 Claims, 15 Drawing Sheets

(51) Int. Cl.
*G06T 7/00* (2006.01)
*G06K 9/32* (2006.01)
*G06K 9/38* (2006.01)

(52) U.S. Cl.
CPC ............. *G06T 7/0087* (2013.01); *G06T 7/0091* (2013.01); *G06T 7/0093* (2013.01); *G06K 9/38* (2013.01); *G06T 2207/10081* (2013.01); *G06T 2207/10088* (2013.01); *G06T 2207/10104* (2013.01); *G06T 2207/10116* (2013.01); *G06T 2207/20148* (2013.01); *G06T 2207/30016* (2013.01); *G06T 2207/30024* (2013.01); *G06T 2207/30048* (2013.01); *G06T 2207/30052* (2013.01); *G06T 2207/20036* (2013.01); *G06T 2207/20072* (2013.01); *G06T 2207/20076* (2013.01); *G06T 2207/30056* (2013.01); *G06T 2207/30061* (2013.01); *G06T 2207/30084* (2013.01); *G06T 2207/30088* (2013.01)
USPC ................................ 382/128; 382/173; 378/1

(56) References Cited

U.S. PATENT DOCUMENTS

| | | | | |
|---|---|---|---|---|
| 5,467,404 | A * | 11/1995 | Vuylsteke et al. | 382/274 |
| 5,490,221 | A * | 2/1996 | Ransford et al. | 382/130 |
| 5,982,944 | A * | 11/1999 | Vaidyanathan et al. | 382/271 |
| 6,058,211 | A * | 5/2000 | Bormans et al. | 382/235 |
| 6,470,094 | B1 * | 10/2002 | Lienhart et al. | 382/176 |
| 6,674,907 | B1 * | 1/2004 | Shum et al. | 382/225 |
| 6,885,762 | B2 * | 4/2005 | Saha et al. | 382/131 |
| 7,027,508 | B2 * | 4/2006 | Shibata et al. | 375/240.08 |
| 7,058,210 | B2 * | 6/2006 | Mundy et al. | 382/128 |
| 7,137,062 | B2 * | 11/2006 | Kaufman et al. | 715/200 |
| 7,599,535 | B2 * | 10/2009 | Kiraly et al. | 382/128 |
| 7,636,484 | B2 * | 12/2009 | Blaffert et al. | 382/254 |
| 7,907,769 | B2 * | 3/2011 | Sammak et al. | 382/133 |
| 8,107,726 | B2 * | 1/2012 | Xu et al. | 382/173 |
| 8,295,575 | B2 * | 10/2012 | Feldman et al. | 382/131 |
| 8,385,609 | B2 * | 2/2013 | Piramuthu et al. | 382/118 |
| 2002/0122596 | A1 | 9/2002 | Bradshaw | |
| 2003/0179824 | A1 * | 9/2003 | Kan et al. | 375/240.1 |
| 2006/0142983 | A1 | 6/2006 | Sorensen et al. | |
| 2006/0269167 | A1 | 11/2006 | Venkatesan et al. | |
| 2007/0123773 | A1 | 5/2007 | Fuchs et al. | |
| 2007/0127834 | A1 | 6/2007 | Lee et al. | |
| 2009/0136096 | A1 | 5/2009 | Sirohey et al. | |
| 2009/0170193 | A1 | 7/2009 | Gordon et al. | |

OTHER PUBLICATIONS

Loma Linda University Medical Center et al., European Supplementary Search Report issued in European Patent Application No. 11748009.5 on Apr. 2, 2014.

Loma Linda University Medical Center et al., European Examination Report issued in corresponding European Patent Application No. 11748009.5 on Apr. 23, 2014.

Chen et al., "Split-and-Merge Image Segmentation Based on Localized Feature Analysis and Statistical Tests," CVGIP Graphic Models and Image Processing, Academic Press, Duluth, MA, US, vol. 53, No. 5, Sep. 1, 1991.

Lee et al., "Segmentation of CT Brain Images Using Unsupervised Clusterings," Journal of the Visualization, Omusha, Tokyo, Japan, vol. 12, No. 2, Jan. 1, 2009.

Shen et al., "Coregistration of Magnetic Resonance and Single Photon Emission Computed Tomography Images for Grafted in the Infarcted Rat Myocardium," Molecular Imaging and Biology, Springer-Verlag, NE, vol. 9, No. 1, Oct. 12, 2006.

Ghosh et al., Notice of Allowance issued in parent U.S. Appl. No. 13/580,947 on Apr. 2, 2014.

Result of consultation by telephone/in person and Annex to the communication, re European Application No. 11748009.5, dated Aug. 19, 2014.

* cited by examiner

| LEVEL | IMAGE | RANGE | Th |
|---|---|---|---|
| 0 | '0' | 0-255 | 133 |
| 1 | '1' | 0-132 | 96 |
| 1 | '2' | 133-255 | 182 |
| 2 | '11' | 0-95 | 76 |
| 2 | '12' | 96-132 | 115 |
| 2 | '21' | 133-181 | 154 |
| 2 | '22' | 182-255 | 219 |
| 3 | '111' | 0-75 | ... |
| 3 | '112' | 76-95 | ... |
| 3 | '121' | 96-114 | ... |
| 3 | '122' | 115-132 | ... |
| 3 | '211' | 133-153 | ... |
| 3 | '212' | 154-181 | ... |
| 3 | '221' | 182-218 | ... |
| 3 | '222' | 219-255 | ... |

FIG. 3

METHOD OF ANALYZING A MEDICAL IMAGE

CROSS-REFERENCE TO RELATED APPLICATIONS

The present application is a continuation of U.S. patent application Ser. No. 13/580,947 titled "Method of Analyzing a Medical Image," filed Aug. 24, 2012, which is a national stage of International Patent Application No. PCT/US2011/025943, titled "Method of Analyzing a Medical Image," filed Feb. 23, 2011, which claims the benefit of U.S. Provisional Patent Application No. 61/307,396 entitled "Method for Distinguishing Normal from Abnormal Tissue," filed Feb. 23, 2010; and U.S. Provisional Patent Application No. 61/327,630 entitled "Method of Analyzing a Medical Image," filed Apr. 23, 2010, the contents of which are incorporated in this disclosure by reference in their entirety.

STATEMENT REGARDING FEDERALLY SPONSORED RESEARCH OR DEVELOPMENT

This invention was made with United States Government support under Cooperative Agreement Number DAMD17-97-2-7016 with the National Medical Test-Bed, Inc., United States Army Medical Research Acquisition Activity (USAMRAA). The United States Government has certain rights in this invention.

BACKGROUND

Medical imaging, such as for example computed tomography scans (CT scan), magnetic resonance images (MRI), positron emission tomography scans (PET scan) and X-rays are essential for diagnosing and for monitoring the treatment of patients. The gold standard for analyzing a medical image is by human visual inspection and analysis of the image by a trained technician; however, human visual inspection and analysis of the image usually takes from minutes to hours to complete. Often, time is critical in reading a medical image and supplying the results to the personnel treating the patient.

Therefore, there is a need for a method of analyzing a medical image that provides similar results as human visual inspection and analysis of the image by a trained technician that takes substantially less time than human visual inspection and analysis of the image by a trained technician.

SUMMARY

According to one embodiment of the present invention, there is provided a method of analyzing a medical image, where the medical image comprises one or more than one region of interest, and where the method comprises a) providing the medical image comprising a set of actual image values; b) rescaling the actual image values to produce corresponding rescaled image values and to produce a rescaled image from the rescaled image values; c) deriving a histogram of the rescaled image values; d) using the histogram to derive an adaptive segmentation threshold that can be used to split the rescaled image into two sub-images, a first sub-image with intensities at or below the adaptive segmentation threshold and a second sub-image with intensities above the adaptive segmentation threshold, or a first sub-image with intensities below the adaptive segmentation threshold and a second sub-image with intensities at or above the adaptive segmentation threshold, or a first sub-image with intensities below the adaptive segmentation threshold and a second sub-image with intensities above the adaptive segmentation threshold; e) using the adaptive segmentation threshold to recursively split the rescaled image to generate a Hierarchical Region Splitting Tree of sub(sub) images based on consistency of the rescaled image values of the rescaled image; f) terminating the recursive splitting of the sub(sub) images using one or more than one predetermined criteria thereby completing the Hierarchical Region Splitting Tree; and g) identifying one sub(sub) image in the terminated Hierarchical Region Splitting Tree which comprises the region of interest.

According to another embodiment of the present invention, there is provided a method of analyzing a medical image, where the medical image comprises one or more than one region of interest. The method comprises a) configuring at least one processor to perform the functions of: 1) providing the medical image comprising a set of actual image values; 2) rescaling the actual image values to produce corresponding rescaled image values and to produce a rescaled image from the rescaled image values; 3) deriving a histogram of the rescaled image values; 4) using the histogram to derive an adaptive segmentation threshold that can be used to split the rescaled image into two sub-images, a first sub-image with intensities at or below the adaptive segmentation threshold and a second sub-image with intensities above the adaptive segmentation threshold, or a first sub-image with intensities below the adaptive segmentation threshold and a second sub-image with intensities at or above the adaptive segmentation threshold; 5) using the adaptive segmentation threshold to recursively split the rescaled image to generate a Hierarchical Region Splitting Tree of sub(sub) images based on consistency of the rescaled image values of the rescaled image; 6) terminating the recursive splitting of the sub(sub) images using one or more than one predetermined criteria thereby completing the Hierarchical Region Splitting Tree; and 7) identifying one sub(sub) image in the terminated Hierarchical Region Splitting Tree which comprises the region of interest.

In one embodiment, the method further comprises performing a secondary rescaling of the rescaled image values of every rescaled sub(sub) image in the Hierarchical Region Splitting Tree back to the actual image values present in the medical image to create a secondary rescaled medical image, thereby producing a secondarily rescaled sub(sub) image comprising the region of interest. In another embodiment, the one sub(sub) image in the terminated Hierarchical Region Splitting Tree comprising the region of interest is two-dimensional. In another embodiment, the secondarily rescaled sub(sub) image in the terminated Hierarchical Region Splitting Tree comprising the region of interest is three-dimensional. In a preferred embodiment, the secondarily rescaled one sub(sub) image in the terminated Hierarchical Region Splitting Tree comprising the region of interest is two-dimensional. In a preferred embodiment, the one sub(sub) image in the terminated Hierarchical Region Splitting Tree comprising the region of interest is three-dimensional. In one embodiment, the medical image is selected from the group consisting of a computed tomography scan, a magnetic resonance image, a positron emission tomography scan and an X-ray. In one embodiment, the one sub(sub) image in the terminated Hierarchical Region Splitting Tree comprising the region of interest is two-dimensional. In one embodiment, the one sub(sub) image in the terminated Hierarchical Region Splitting Tree comprising the region of interest is three-dimensional. In one embodiment, the region of interest is a representation of an injury to living human tissue and the method detects the representation of the injury. In another embodiment, the method qualifies the representation of the injury. In one embodiment, the medical image is of human tissue is selected from the group consisting of brain, heart, intestines, joints, kidneys, liver, lungs and spleen. In another embodiment, the medical image provided is in a hard copy form, and where the method further comprises preparing a digital form of the medical image before providing the medical image. In one embodiment, the rescaled image values fit in [0,255] unsigned 8-bit integer range. In another embodiment, the predetermined criteria are selected from the group consisting of area threshold=50 pixels and (standard deviation threshold=10 rscVals (StdDevTh=10 rscVals) and kurtosis threshold=1.5).

In one embodiment, there is provided a method of detecting an abnormality in living human tissue. The method comprises analyzing a medical image according to the present invention, where the region of interest is a representation of the abnormality in the living human tissue, and where the method further comprises quantifying the abnormality in the living human tissue. In one embodiment, the abnormality is selected from the group consisting of a genetic malformation and an injury. In one embodiment, the method further comprises performing a secondary rescaling of the rescaled image values in every rescaled sub(sub) image in the Hierarchical Region Splitting Tree back to the actual image values present in the medical image to create a secondary rescaled medical image; and where the method further comprises determining an image value or a set of image values of actual image values in the medical image after the secondary rescaling, where the image value or a set of image values of actual image values determined identifies the abnormality represented in the medical image for the modality being used to generate the medical image provided. In one embodiment, determining the image value or a set of image values of actual image values is made before the step of providing the medical image. In another embodiment, determining the image value or a set of image values of actual image values is made after the step of providing the medical image. In one embodiment, the medical image is a magnetic resonance image and the modality being used to generate the medical image provided is selected from the group consisting of an apparent diffusion coefficient map, a magnetic susceptibility map and a T2 map. In another embodiment, the method further comprises preparing a mask of the sub(sub) image containing the representation of the abnormality, and cleaning the mask to remove small outlier regions to generate a cleaned mask of the sub(sub) image containing the representation of the abnormality.

In one embodiment, there is provided a method of detecting a core of an injury and detecting a penumbra of an injury in living human tissue, and distinguishing the core from the penumbra, the method comprising: a) detecting one sub(sub) image (the injury sub-image) in the terminated Hierarchical Region Splitting Tree comprising the region of interest, where the region of interest represents the injury according to the present invention; b) determining the mask of the injury; c) determining a sub-tree below the detected injury sub-image using the injury sub-image as the root of the sub-tree; d) determining the soft threshold image values for separating the core from the penumbra; e) comparing the soft threshold image values inside the sub-tree to find the penumbra and a mask of the penumbra; and f) determining the mask of the core by subtracting the mask of the penumbra from the mask of the injury. In one embodiment, the method further comprises determining different gradations of the core and the penumbra.

In one embodiment, the method further comprises quantifying the spatiotemporal evolution of an injury in living human tissue.

In another embodiment, there is provided a method of detecting the effects of endogenous or implanted stem cells on living human tissue. The method comprises a) determining magnetic resonance image values of labeled and implanted stem cells; b) detecting the stem cells outside of the region of interest using a method according to the present invention; and c) detecting the stem cells inside of the region of interest using a method according to the present invention. In one embodiment, the method further comprises quantifying spatiotemporal activities of implanted labeled stem cells in the living human tissue.

According to another embodiment of the present invention, there is provided a method of detecting a core of an injury and detecting a penumbra of an injury in living human tissue, and distinguishing the core from the penumbra. The method comprises a) configuring at least one processor to perform the functions of: 1) detecting one sub(sub) image (the injury sub-image) in the terminated Hierarchical Region Splitting Tree comprising the region of interest, where the region of interest represents the injury according to the present invention; 2) determining the mask of the injury; 3) determining a sub-tree below the detected injury sub-image using the injury sub-image as the root of the sub-tree; 4) determining the soft threshold image values for separating the core from the penumbra; 5) comparing the soft threshold image values inside the sub-tree to find the penumbra and a mask of the penumbra; and 6) determining the mask of the core by subtracting the mask of the penumbra from the mask of the injury. In one embodiment, the method further comprises determining different gradations of the core and the penumbra. In another embodiment, the method further comprises quantifying the spatiotemporal evolution of an injury in living human tissue.

According to one embodiment of the present invention, there is provided a method of detecting the effects of endogenous or implanted stem cells on living human tissue. The method comprises a) configuring at least one processor to perform the functions of: 1) determining magnetic resonance image values of labeled and implanted stem cells; 2) detecting the stem cells outside of the region of interest using a method according the present invention; and 3) detecting the stem cells inside of the region of interest using a method according to the present invention. In one embodiment, the method further comprises quantifying spatiotemporal activities of implanted labeled stem cells in the living human tissue.

According to another embodiment of the present invention, there is provided a system for analyzing a medical image, where the medical image comprises one or more than one region of interest. The system comprises a) one or more than one processor; b) a machine readable storage connected to the one or more than one processor; c) a medical image comprising a set of actual image values stored in the storage; d) a set of machine readable instructions stored in the machine readable storage and operable on the medical image; e) a user interface operably connected to the set of computer instructions for transmitting one or more than one command to the one or more than one processor; f) instructions operably connected to the user interface for rescaling the actual image values to produce corresponding rescaled image values and to produce a rescaled image from the rescaled image values; g) instructions operably connected to the user interface for deriving a histogram of the rescaled image values; h) instructions operably connected to the user interface for using the histogram to derive an adaptive segmentation threshold that can be used to split the rescaled image into two sub-images, a first sub-image with intensities at or below the adaptive segmentation threshold and a second sub-image with intensities above the adaptive segmentation threshold, or a first sub-image with intensities below the adaptive segmentation threshold and a second sub-image with intensities at or above the adaptive segmentation threshold; i) instructions operably connected to the user interface for using the adaptive segmentation threshold to recursively split the rescaled image to generate a Hierarchical Region Splitting Tree of sub(sub) images based on consistency of the rescaled image values of the rescaled image; j) instructions operably connected to the user interface for terminating the recursive splitting of the sub(sub) images using one or more than one predetermined criteria thereby completing the Hierarchical Region Splitting Tree; k) instructions operably connected to the user interface for identifying one sub(sub) image in the Hierarchical Region Splitting Tree comprising the region of interest; and l) a storage operably connected to the one or more than one processor and the user interface for storing the resultant Hierarchical Region Splitting Tree images.

DRAWINGS

These and other features, aspects and advantages of the present invention will become better understood with regard to the following description, appended claims, and accompanying drawings where:

FIG. 3 is a corresponding table of rescaled apparent diffusion coefficient image values for the rescaled image showing the adaptive segmentation threshold (Th) found for the histogram in FIG. 2;

Figure 2:
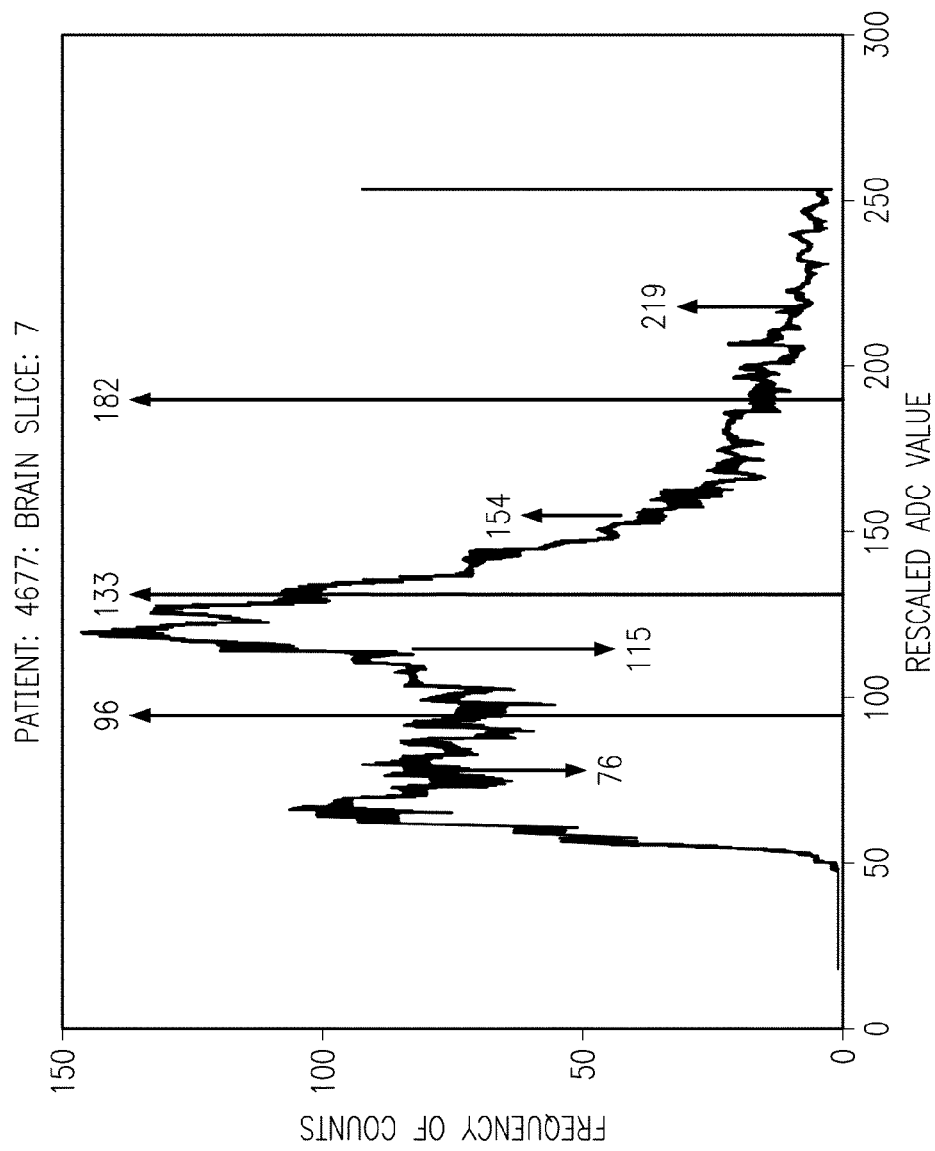
FIG. 2 is a histogram of a rescaled apparent diffusion coefficient image plotting rescaled apparent diffusion coefficient (ADC) image values in the rescaled apparent diffusion coefficient image on the x axis (in this case apparent diffusion coefficient image values) versus frequency of each rescaled image value in the rescaled image on the y axis.
Figure 5:
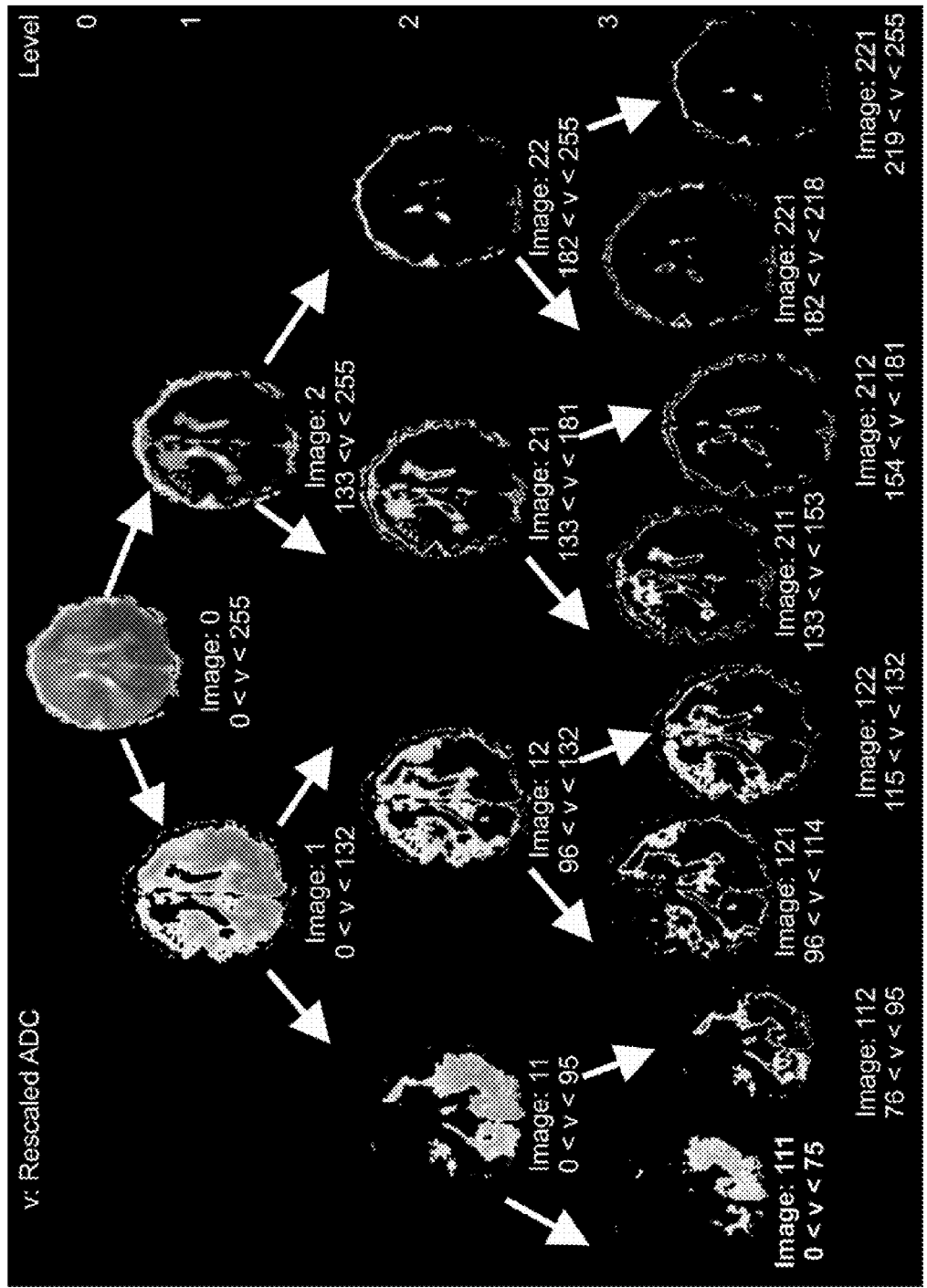
Figure 6:
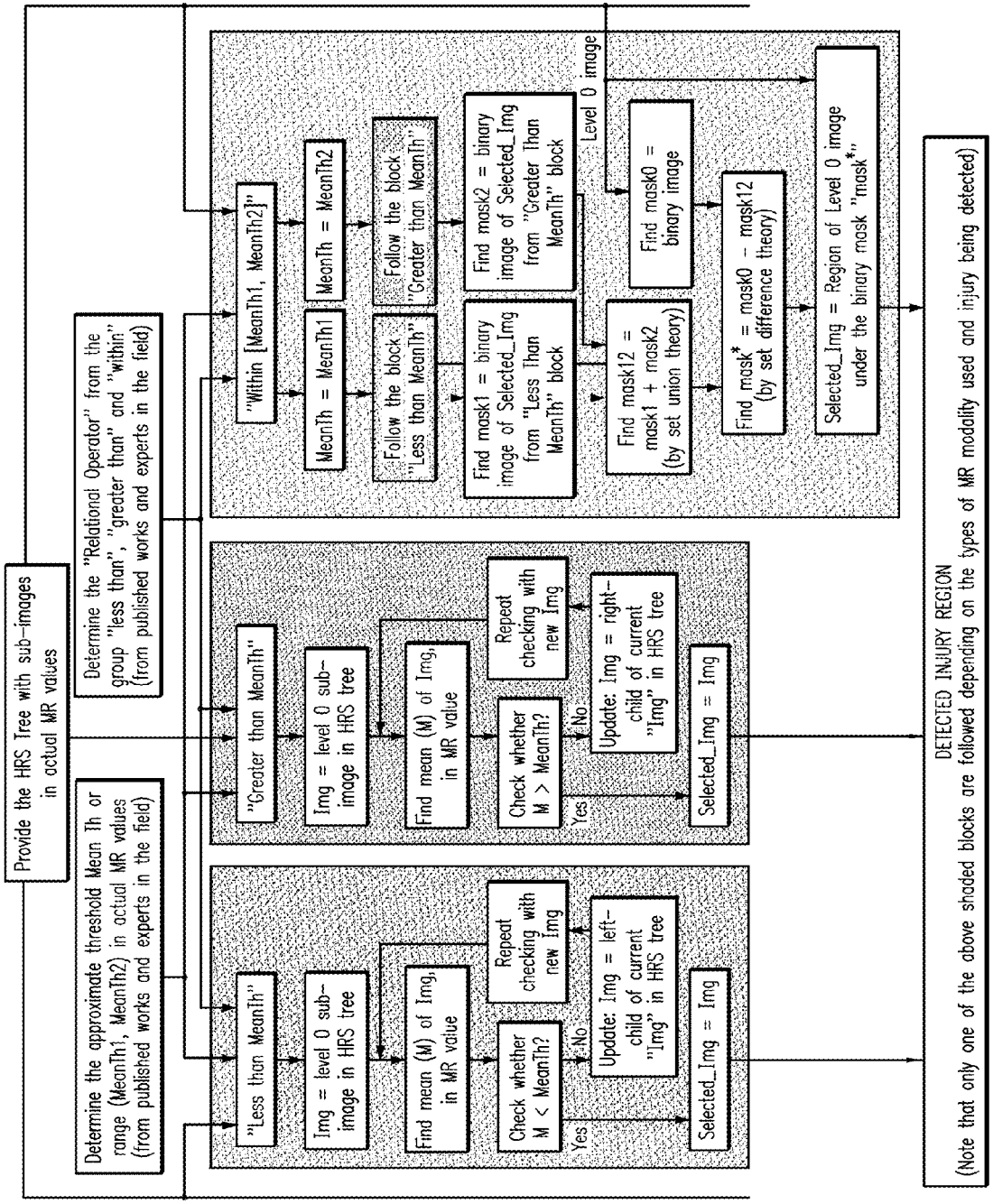
Figure 7:
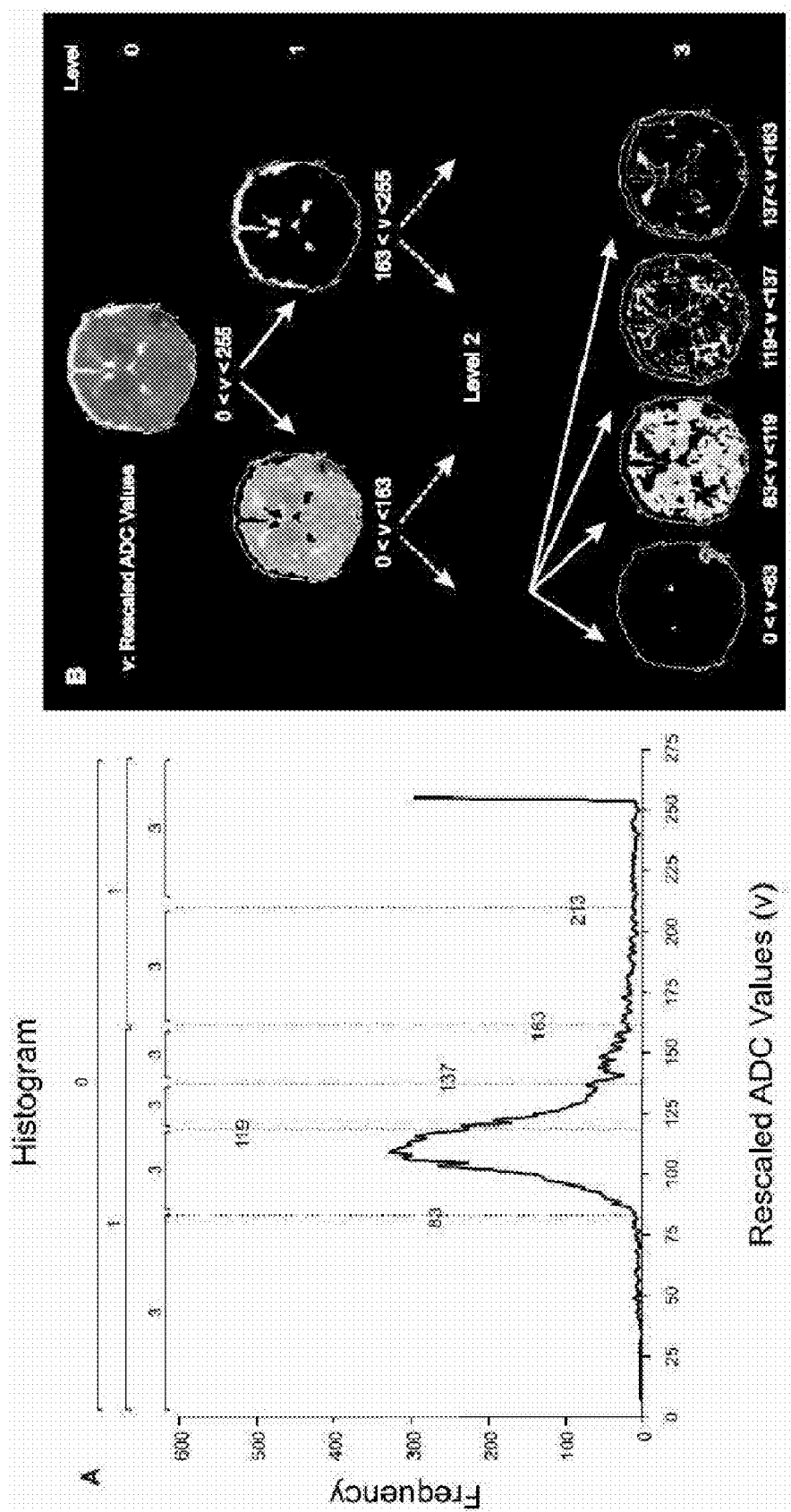
Figure 8:
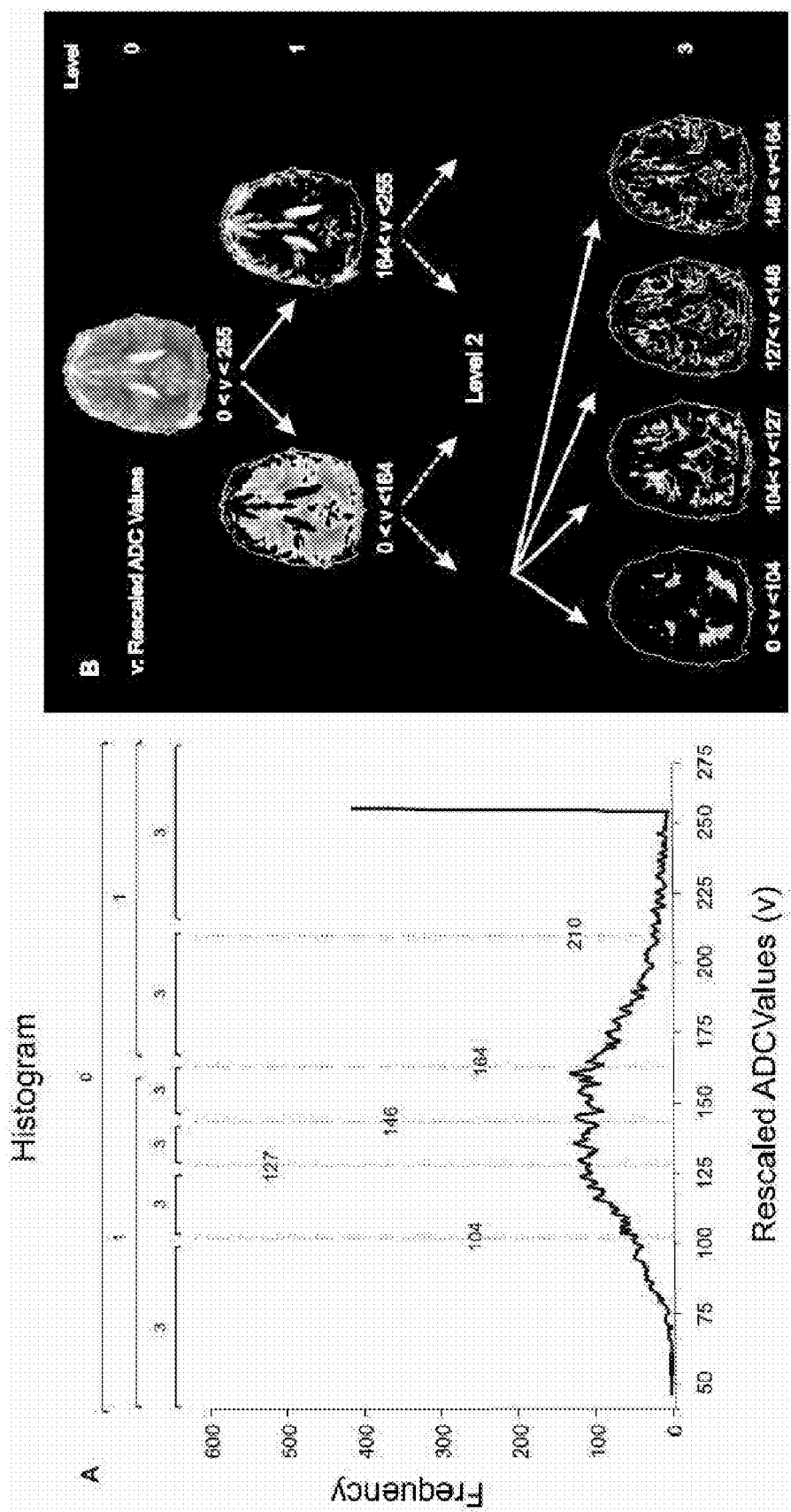
Figure 9:
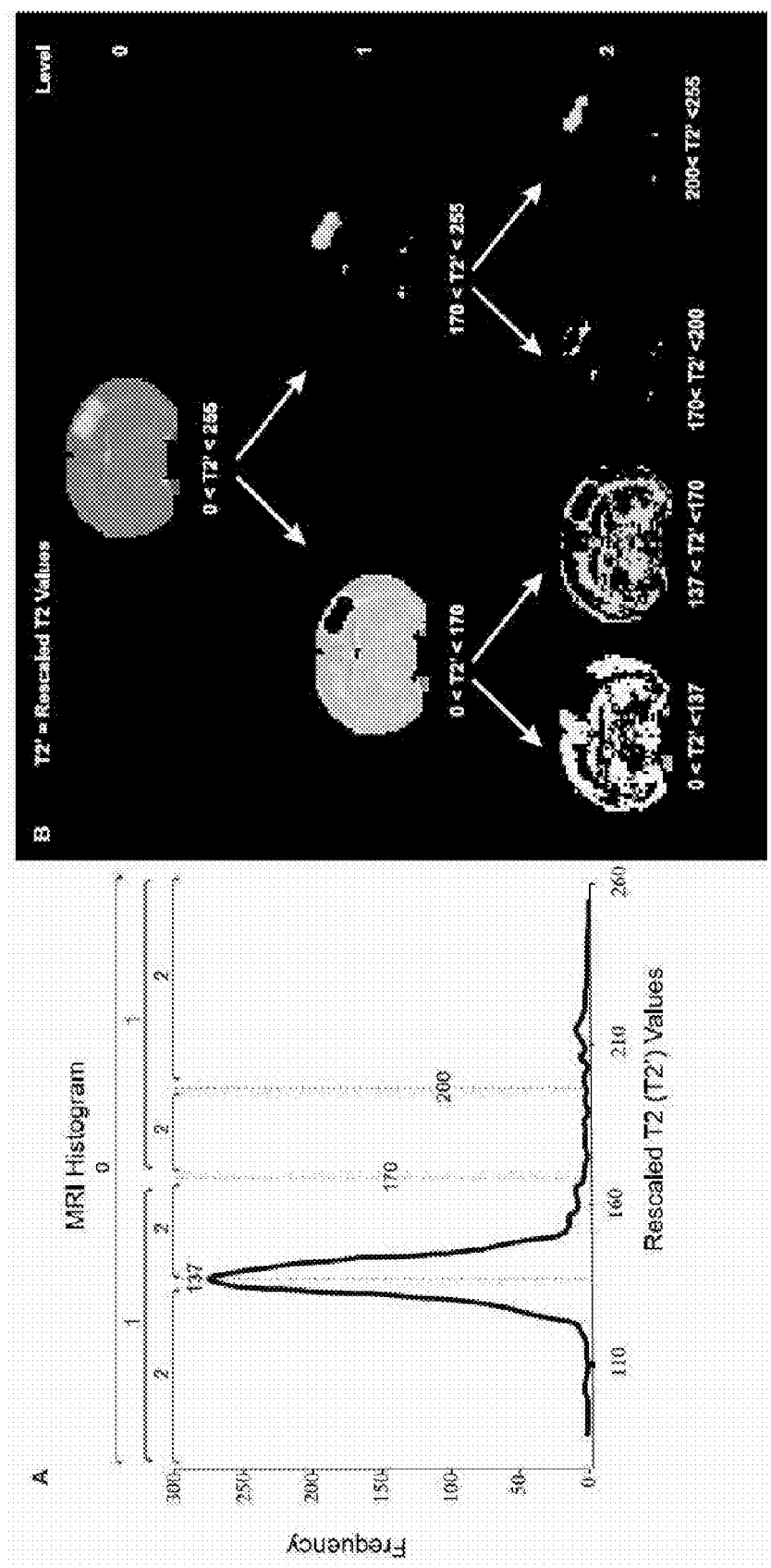
Figure 10:
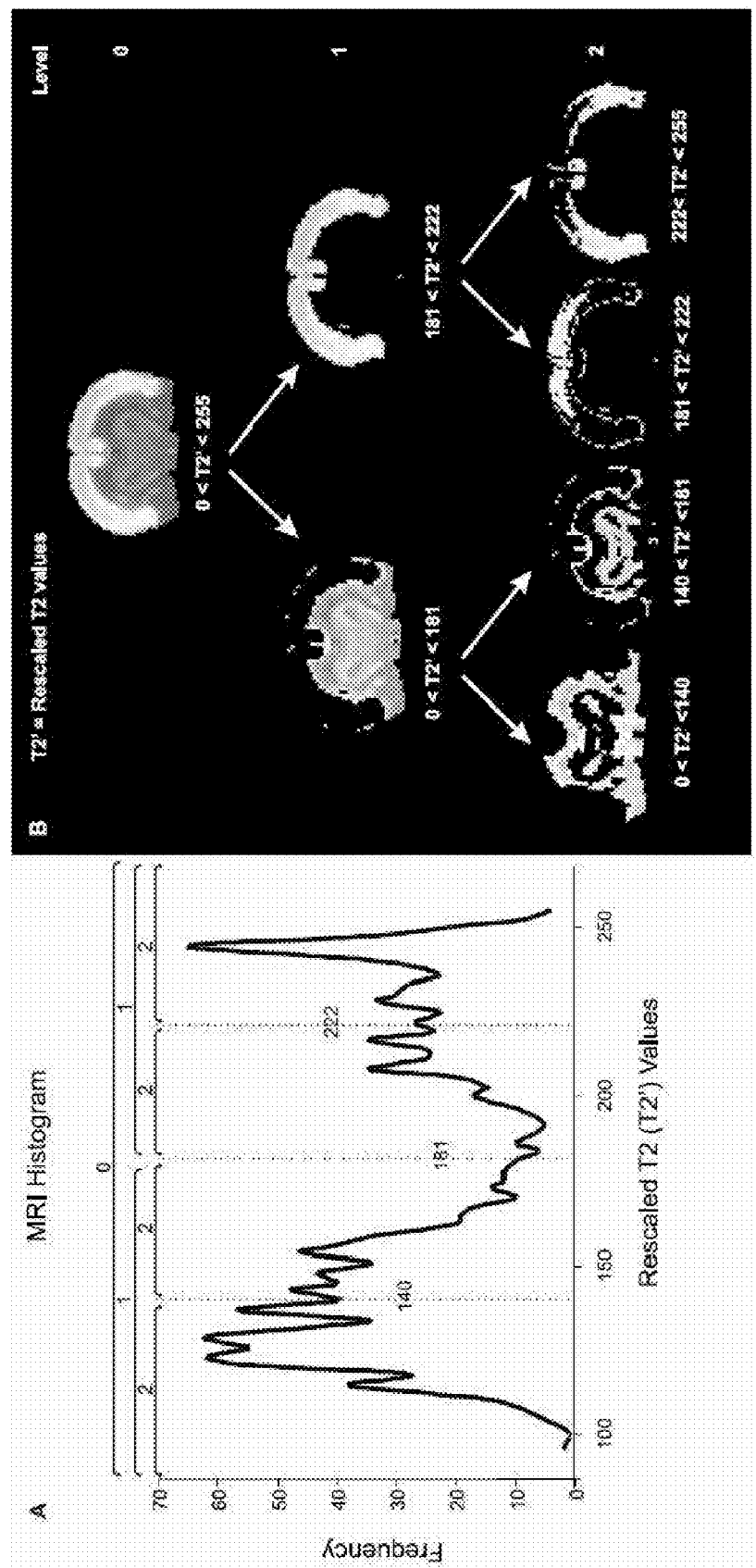
Figure 11:
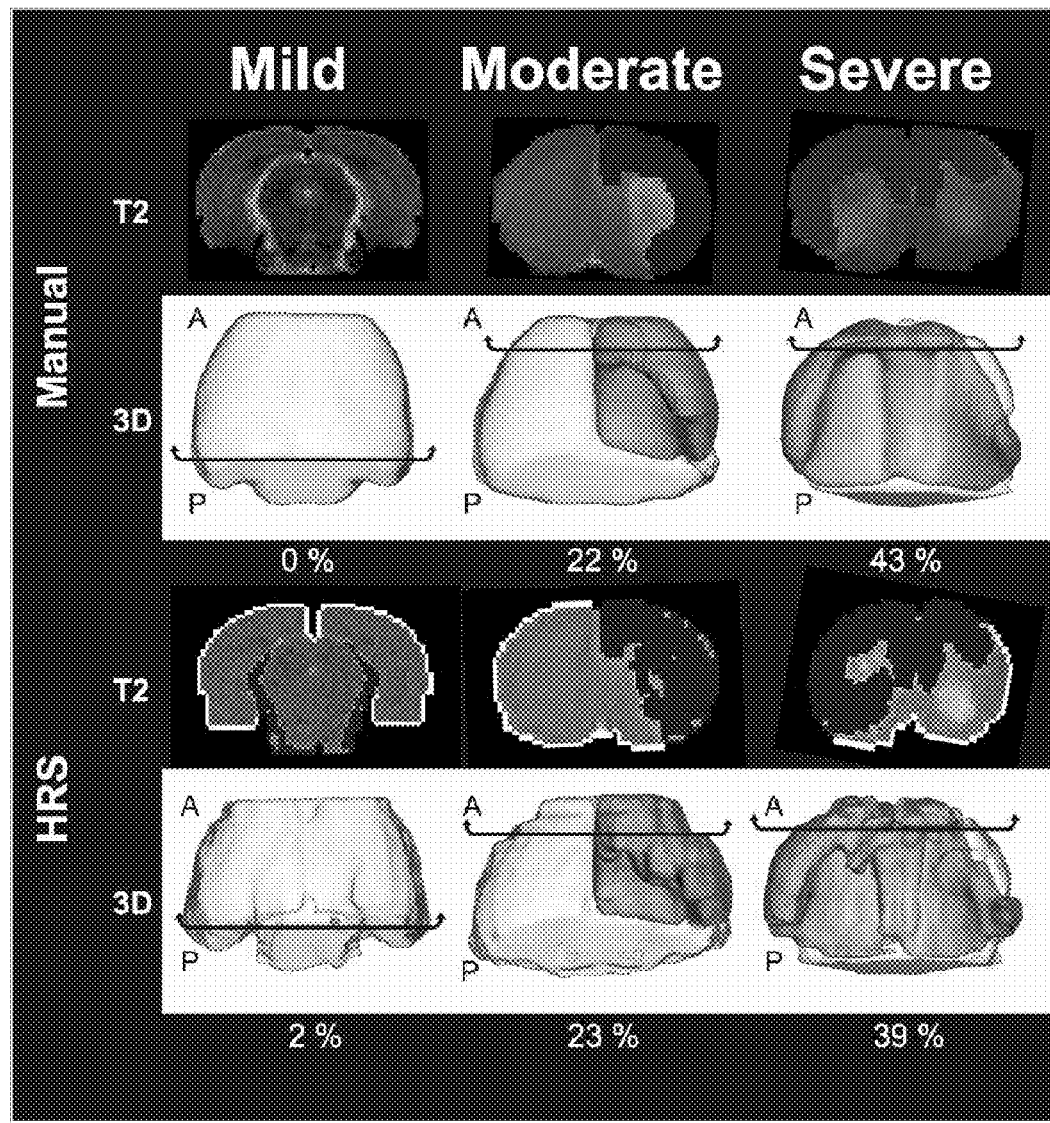
Figure 12:
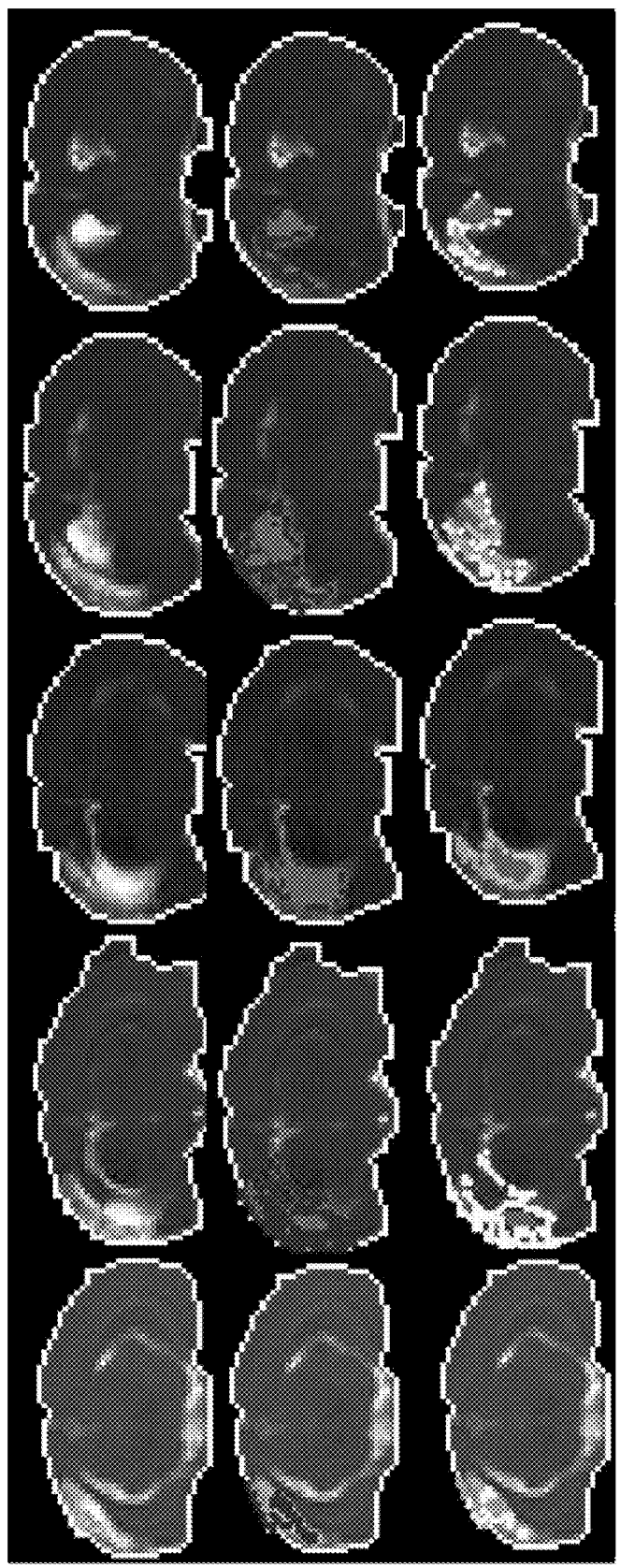
Figure 13:
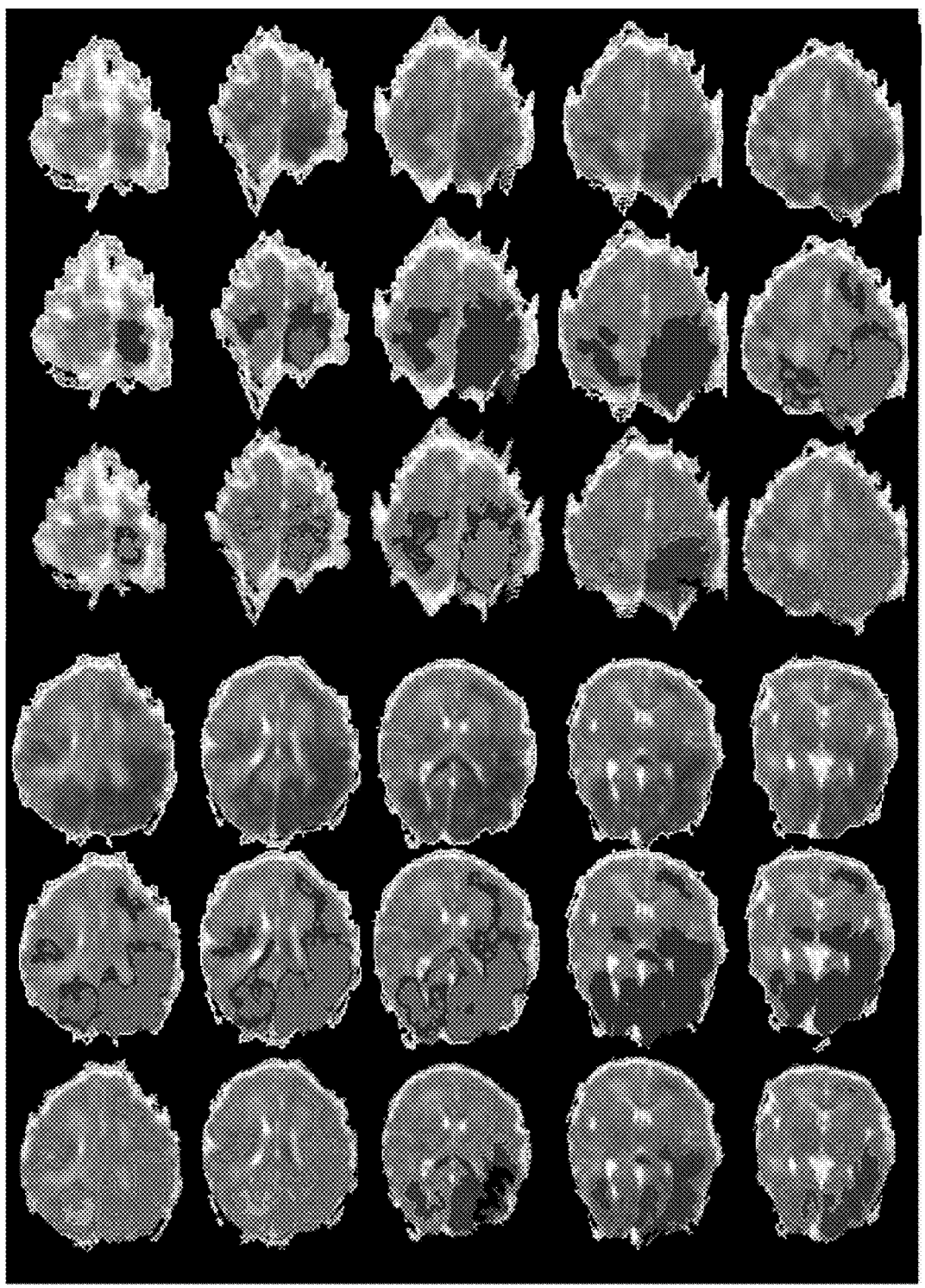
Figure 14:
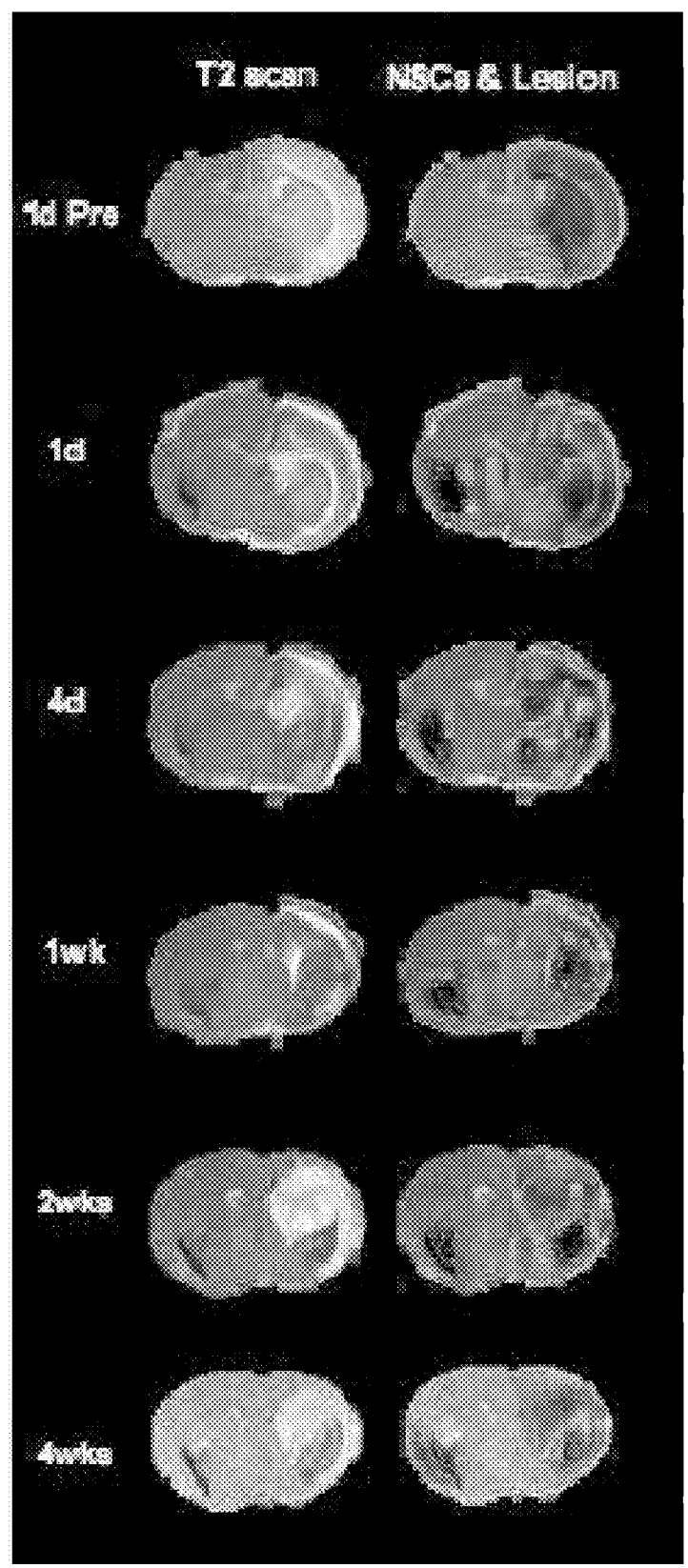

FIG. 5 is a diagram of the top levels of a Hierarchical Region Splitting Tree generated by the method of the present invention for a magnetic resonance image which was generated from the histogram of FIG. 2, where the level of image splitting is shown on the right side of the diagram beginning with the first image, Image 0, and the number of each sub-image and the range of rescaled image values (v) present in the sub-image are shown below each sub-image;

FIG. 6 is a block diagram showing some steps in another method according to the present invention of detecting an abnormality in living human tissue using a magnetic resonance image as an example;

FIG. 7 and FIG. 8 show a histogram (left) of a rescaled image (plotting apparent diffusion coefficient rescaled image values in the rescaled image on the x axis versus frequency of each rescaled image value in the rescaled image on the y axis) and the part of the corresponding diagram (right) (Level 0, Level 1 and Level 3) of the levels of a Hierarchical Region Splitting Tree generated by the method of the present invention for a magnetic resonance image which was generated from the histogram (left), where the level of image splitting is shown on the right side of the diagram beginning with the first image, Image 0, and the range of rescaled image values present in the sub-image are shown below each sub-image, where FIG. 6 is generated from the brain of a human neonatal patient with a mild ischemic injury, and FIG. 7 is generated from the brain of a human neonatal patient with a severe ischemic injury;

FIG. 9 and FIG. 10 show a histogram (left) of a rescaled image (plotting T2 relaxation time rescaled image values in the rescaled image on the x axis versus frequency of each rescaled image value in the rescaled image on the y axis) and the part of the corresponding diagram (right) (Level 0, Level 1 and Level 2) of the levels of a Hierarchical Region Splitting Tree generated by the method of the present invention for a magnetic resonance image which was generated from the histogram (left), where the level of image splitting is shown on the right side of the diagram beginning with the first image, Image 0, and the range of rescaled image values present in the sub-image are shown below each sub-image, where FIG. 9 is generated from a rat brain with a mild ischemic injury, and FIG. 10 is generated from a rat brain with a severe ischemic injury;

FIG. 11 is a diagram comparing volumetric results of magnetic resonance images of injured brains using methods according to the present invention (HRS) and using standard manual methods at different injury-severities;

FIG. 12 is a diagram of core-penumbra injury detected according to the present invention in an animal brain;

FIG. 13 is a diagram of core-penumbra injury detected according to the present invention in a human neonatal brain; and FIG. 14 is a diagram depicting the detection of iron-labeled stem cells in an ischemic animal brain over four weeks, where red is the ischemic lesion, yellow is the iron-labeled murine neuronal stem cells.

DESCRIPTION

According to one embodiment of the present invention, there is provided a method of analyzing a medical image comprising a region of interest, such as for example a medical image selected from the group consisting of a computed tomography scan (CT scan), a magnetic resonance image (MRI), a positron emission tomography scan (PET scan) and an X-ray. In one embodiment, the region of interest is a representation of an abnormality of living human tissue, such as for example an injury to living human tissue, and the method detects the representation of the abnormality. In a preferred embodiment, the method additionally qualifies the region of interest. In another embodiment, there is provided a method of detecting a core of an injury and detecting a penumbra of an abnormality of living human tissue, such as for example an injury to living human tissue, and distinguishing the core from the penumbra. According to one embodiment of the present invention, there is provided a method of quantifying the spatiotemporal evolution of an abnormality of living human tissue, such as for example an injury to living human tissue. According to another embodiment of the present invention, there is provided a method of detecting the effects of endogenous or implanted neuronal stem cells (NSCs) on living human tissue. In a preferred embodiment, the living human tissue is a human brain.

The present method is an automated computational method referred to as "Hierarchical Region Splitting" (HRS). Using a magnetic resonance image as an example of a medical image, Hierarchical Region Splitting advantageously analyzes a magnetic resonance image approximately 100 times faster than analyzing the magnetic resonance image by visual inspection and analysis of the image by a trained technician which are the gold standard of analyzing magnetic resonance images. Also advantageously, Hierarchical Region Splitting can analyze medical images such as magnetic resonance images and computed tomography scan in both two dimensions and in three dimensions. Further advantageously, Hierarchical Region Splitting does not require an atlas of normal or diseased tissue for comparison, or depend on a probabilistic disease model which are required by some other methods of analyzing medical images such as magnetic resonance images. Hierarchical Region Splitting can be used for a variety of analyses, including detecting and quantifying an abnormality, such as for example an ischemic injury, to a human brain or other tissue, qualifying the abnormality, analyzing the internal characteristics of the abnormality, quantifying the spatiotemporal evolution of the abnormality, as well as determining the effects of endogenous or implanted neuronal stem cells (NSCs) on living human tissue.

As used in this disclosure, except where the context requires otherwise, the term "comprise" and variations of the term, such as "comprising," "comprises" and "comprised" are not intended to exclude other additives, components, integers or steps. Thus, throughout this disclosure, unless the context requires otherwise, the words "comprise," "comprising" and the like, are to be construed in an inclusive sense as opposed to an exclusive sense, that is to say, in the sense of "including, but not limited to."

As used in this disclosure, except where the context requires otherwise, the method steps disclosed and shown are not intended to be limiting nor are they intended to indicate that each step is essential to the method or that each step must occur in the order disclosed.

As using in this disclosure, "injury" includes both traumatic injury (such as for example gun shot wound) and non-traumatic injury (such as for example ischemic stroke) as will be understood by those with skill in the art with reference to this disclosure.

As used in this disclosure, a "mask" of a region (such as "region A" in a sub-image) is a black-and-white image referred to as a "binary image" (usually of the same size as the original image), where a pixel in white means that pixel is inside the region and a pixel in black means that pixel is outside the region. This binary image, when superimposed on the original medical image (Level 0 of the Hierarchical Region Splitting Tree disclosed below), reveals the sub-image containing region A only.

As used in this disclosure, the term "machine readable medium" includes, but is not limited to portable or fixed storage devices, optical storage devices, wireless channels and various other mediums capable of storing, containing or carrying either data, one or more than one instruction or both data and one or more than one instruction.

As used in this disclosure, the term "computing device" includes, but is not limited to computers, cellular telephones, hand-held computers and other devices that are capable of executing programmed instructions that are contained in a storage including machine readable medium.

In the following disclosure, specific details are given to provide a thorough understanding of the embodiments. However, it will be understood by one of ordinary skill in the art that the embodiments can be practiced without these specific details. Well-known circuits, structures and techniques are not necessarily shown in detail in order not to obscure the embodiments. For example, circuits can be shown in block diagrams in order not to obscure the embodiments in unnecessary detail.

Also, some embodiments are disclosed as a process that is depicted as a flowchart, a flow diagram, a structure diagram, or a block diagram. Although a flowchart discloses the operations as a sequential process, many of the operations can be performed in parallel or concurrently. In addition, the order of the operations can be rearranged. A process is terminated when its operations are completed. A process can correspond to a method, a function, a procedure, a subroutine, a subprogram. When a process corresponds to a function, termination of the process corresponds to a return of the function to the calling function or the main function.

Moreover, a storage can represent one or more devices for storing data, including read-only memory (ROM), random access memory (RAM), magnetic disk storage mediums, optical storage mediums, flash memory devices and other machine readable mediums for storing information.

Furthermore, embodiments can be implemented by hardware, software, firmware, middleware, microcode, or a combination of the proceeding. When implemented in software, firmware, middleware or microcode, the program code or code segments to perform the necessary tasks can be stored in a machine-readable medium such as a storage medium or other storage(s). One or more than one processor can perform the necessary tasks in series or in parallel. A code segment can represent a procedure, a function, a subprogram, a program, a routine, a subroutine, a module, a software package, a class, or a combination of instructions, data structures, or program statements. A code segment can be coupled to another code segment or a hardware circuit by passing or by receiving information, data, arguments, parameters, or memory contents. Information, arguments, parameters and data can be passed, forwarded, or transmitted through a suitable means, such as for example memory sharing, message passing, token passing, network transmission.

According to one embodiment of the present invention, there is provided a method of analyzing a medical image comprising a region of interest, such as for example an image selected from the group consisting of a computed tomography scan (CT scan), a magnetic resonance image (MRI), a positron emission tomography scan (PET scan) and an X-ray. In one embodiment, the region of interest is a representation of an injury to living human tissue and the method detects the representation of the injury, however, the region of interest can be a representation of any abnormality as will be understood by those with skill in the art with reference to this disclosure. In one embodiment, the region of interest comprises a representation of an abnormality to living human tissue and the method both detects the representation of the abnormality and qualifies the representation of the abnormality. In one embodiment, the human tissue is selected from the group consisting of heart, intestines, joints, kidneys, liver, lungs and spleen, though any suitable tissue can be used as will be understood by those with skill in the art with reference to this disclosure. In a preferred embodiment, the living human tissue is brain. The method will now be disclosed in greater detail with reference to magnetic resonance imaging of the living human brain as an example of the method, though corresponding steps can be used with other types of medical images and other types of human tissue, as will be understood by those with skill in the art with reference to this disclosure.

Figure 1A:
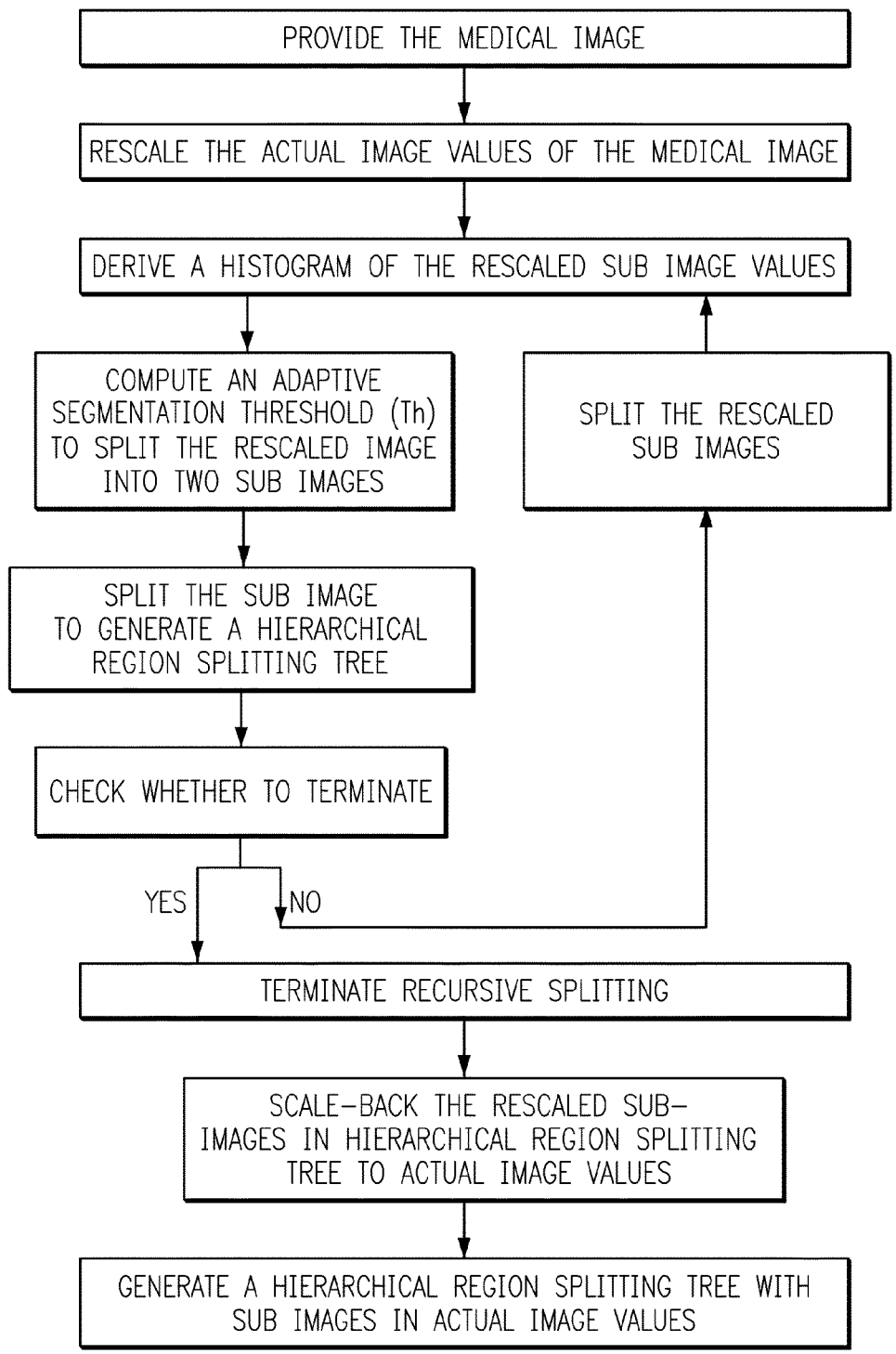
FIGS. 1A and 1B are block diagrams showing some steps in a method according to the present invention of analyzing a medical image according to the present invention.
Figure 1B:
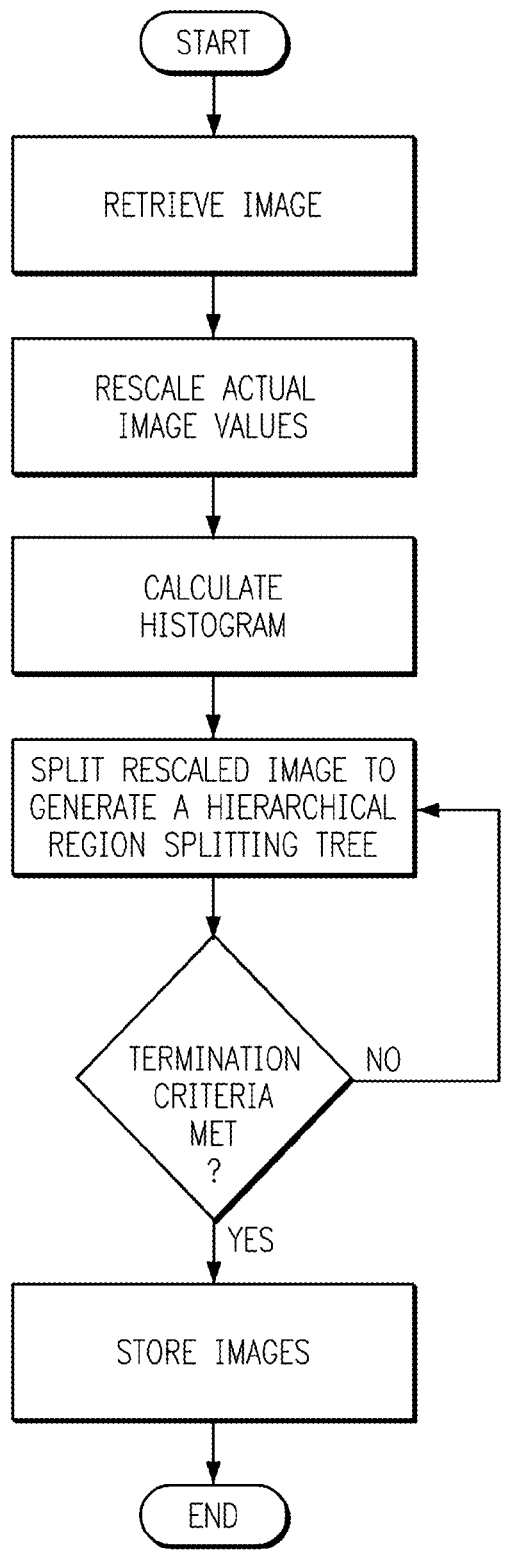

According to one embodiment of the present invention, there is provided a method of analyzing a medical image. Referring now to FIGS. 1A and 1B, there are shown block diagrams showing some steps in a method according to the present invention of analyzing a medical image according to the present invention. As can be seen, in one embodiment, the method comprises first, providing a medical image. The medical image can be produced specifically for the present method or can be previously produced for another purpose and then used in the present method. The medical image provided can be in a hard copy form (such as for example a film or print form) or can be in a digital form. If the medical image provided is in a hard copy form, the method further comprises preparing a digital form of the medical image. The digital form of the medical image comprises a set of actual image values.

Next, the method comprises rescaling the actual image values to produce corresponding rescaled image values and a rescaled image from the rescaled image values. In a preferred embodiment, the medical image is a magnetic resonance image and the actual image values are rescaled to fit in [0,255] unsigned 8-bit integer range; however, other ranges can be used as will be understood by those with skill in the art with reference to this disclosure. The rescaling can be accomplished by any suitable method, as will be understood by those with skill in the art with reference to this disclosure. In one embodiment, rescaling is accomplished using the following formula:

$$\frac{(rscVal - minRSCVal)}{maxRSCVal - minRscVal} = \frac{(actVal - minActVal)}{(maxActVal - minActVal)}$$

where minActVal is "minimum actual image value," maxActVal is "maximum actual image value," minRscVal is "minimum rescaled image value," and maxRscVal is "maximum rescaled image value." As an example of the rescaling step of the method, according to the present invention, the actual image values of a magnetic resonance image were rescaled to generate a "rescaled image" (rscImg) by:
  a) finding the "scale-factors" in the magnetic resonance image ("Img"), where the scale factors consist of a "maximum image value" (maxVal) and a "minimum image value" (minVal);
  b) converting each "actual image value" (actVal) in the magnetic resonance image to a corresponding "rescaled image value" (rscVal), such as for example by using the formula:

rscVal=(actVal−minVal)/(maxVal−minVal)*255 thereby producing a group of rescaled image values;
  c) saving the scale-factors for converting each rescaled image value back to the corresponding actual image value; and
  d) generating the rescaled image of the magnetic resonance image using the group of rescaled image values.

Then, the method comprises deriving a histogram of the rescaled image values. Deriving the histogram can be accomplished by:
  a) determining the frequency that a particular rescaled image value in the range [0,255] appears in the rescaled image; and
  b) producing an array [rescaled image values, frequency] in the form of a histogram ("H") providing the following:

$H(i) i \in [1,N]$; where $N=255$

Next, the method comprises computing an adaptive segmentation threshold (also referred to as a "histogram shape-based image threshold") that can be used to split the gray level image of the rescaled image into two sub-images, a first sub-image with intensities at or below the adaptive segmentation threshold and a second sub-image with intensities above the adaptive segmentation threshold, or alternately a first sub-image with intensities below the adaptive segmentation threshold and a second sub-image with intensities at or above the adaptive segmentation threshold, or alternately a first sub-image with intensities below the adaptive segmentation threshold and a second sub-image with intensities above the adaptive segmentation threshold. The adaptive segmentation threshold can be computed using any standard technique, as will be understood by those with skill in the art with reference to this disclosure. In a preferred embodiment, the adaptive segmentation threshold is computed using Otsu's method, as will be understood by those with skill in the art with reference to this disclosure. In summary, the histogram H(i) is fit to a bimodal distribution (a function with two peaks), where each of the two peaks corresponds to a distinct cluster of image values from a relatively uniform region of the rescaled image, and where each of the two peaks is distinct and separated enough to be considered two different clusters. A valley (or trough) between the two peaks is found that can separate the two peaks. The rescaled image value of this valley is used as the adaptive segmentation threshold ("Th"). Referring now to FIG. 2 and FIG. 3, there are shown, respectively, a histogram of a rescaled apparent diffusion coefficient (ADC) image plotting rescaled apparent diffusion coefficient image values in the rescaled apparent diffusion coefficient image on the x axis (in this case apparent diffusion coefficient image values) versus frequency of each rescaled image value in the rescaled image on the y axis (FIG. 2); and the corresponding table of rescaled apparent diffusion coefficient image values for the rescaled image showing the adaptive segmentation threshold (Th) found for the histogram (FIG. 3).

The adaptive segmentation threshold (FIG. 3, right column) was determined as follows:
  a) the histogram (H(i)) was normalized to get the probabilistic distribution function, (pdf, p(i));

$$p(i) = H(i) \bigg/ \sum_{i=1}^{N} H(i) \text{ where, } N = 255$$

b) the cumulative distribution function cdf, ((i)) was found that is cumulative sum of the pdf, p(I);

$$\Omega(i) = \sum_{j=1}^{i} p(j)$$

c) the cumulative weighted means (µ(i)) of the pdf, p(i) was found;

$$\mu(i) = \sum_{j=1}^{i} p(j) * j$$

d) the final weighted mean (µt) was found;

$\mu_t = \mu(N)$ where, N=255
  e) Otsu's measure (b2(i)) was computed using the formula:

$$\sigma_b^2(i) = \frac{[\mu_t * \Omega(i) - \mu(i)]^2}{[\Omega(i) * (1 - \Omega(i))]}$$

f) the mode (the number most frequently occurring in a series of numbers; idx) was found in the series b2(i). If there were more than one mode, the mean of modes were used:

$idx = \text{mean}[\text{modes}(\sigma_b^2)]$ g) the normalized threshold (the adaptive segmentation threshold (Th), was found using the following formula:

$$Th = \frac{(idx-1)}{(N-1)} \text{ where, } N = 255$$

where, N=255

Figure 4:
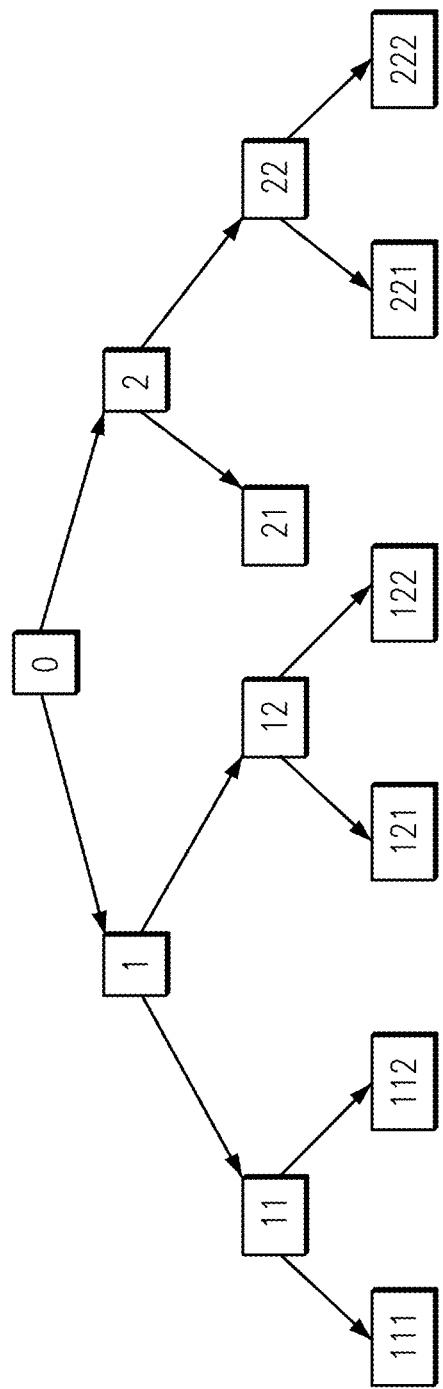
FIG. 4 is a schematic showing nomenclature rules for the recursive splitting of a rescaled image.

Then, the method comprises recursively splitting the rescaled image using recursive bimodal segmentation to generate a hierarchical tree (a "Hierarchical Region Splitting Tree") of sub(sub) images based on consistency of the rescaled image values. Referring now to FIG. 4, there is shown a schematic showing nomenclature rules for recursive splitting of a rescaled image, respectively. In a preferred embodiment, the rescaled image is recursively split for example by:

a) using the adaptive segmentation threshold to split the rescaled image into two sub-images: Lo_Img=(rscImg<Th) and Hi_Img=(rscImg≥Th);

b) splitting the Lo_Img into 2 sub-sub-images using the steps above (i. deriving a histogram, ii. computing an adaptive segmentation threshold, and iii. splitting the rescaled image using the adaptive segmentation threshold);

c) splitting the Hi_Img into 2 sub-sub-images using the steps above (i. deriving a histogram, ii. computing an adaptive segmentation threshold, and iii. splitting the rescaled image using the adaptive segmentation threshold);

d) continuing to recursively split the sub-sub images generated by steps b) and c) to generate a hierarchical structure of split image regions using corresponding steps, and placing the images obtained by recursive splitting in a Hierarchical Region Splitting Tree.

The sub-images are named following the rules below:

Rule 1: Level 0: Image 0 is the entire rescaled image forming the root of the Hierarchical Region Splitting Tree.

Rule 2: Level 1, sub-images: Image 1 is Lo_Img, one of the first two recursively split images from image 0 (placed as the left-leaf (left-child) in the Hierarchical Region Splitting Tree). Image 2 is Hi_img, the other of the first two recursively split images from image 0 (placed as the right-leaf (right-child) in the Hierarchical Region Splitting Tree).

Rule 3: Level 2, sub-sub images: Image 11 and Image 12 are the two recursively split images from Image 1 (placed as the left-leaf (left-child) and the right-leaf (right-child) of Image 1, respectively, in the Hierarchical Region Splitting Tree) and a right-child "12"; Image 21 and Image 22 are the two recursively split images from Image 2 (placed as the left-leaf (left-child) and the right-leaf (right-child) of Image 2, respectively, in the Hierarchical Region Splitting Tree);

Rule 4: The Lo_Img=(rscImg<Th) for each subsequent recursively split parent image is named Image [number(s) of the parent followed by a "1"]; and the Hi_Img=(rscImg≥Th) for each subsequent recursively split parent image is named Image [number(s) of the parent followed by a "2"].

The further generated images continue to be split and named according to Rule 4, as shown in FIG. 4, until predetermined split-termination criteria (disclosed below) are fulfilled.

Next, the method comprises terminating the recursive splitting of the sub(sub) images using one or more than one predetermined criterion, and then identifying, preferably, one sub(sub) image in the terminated Hierarchical Region Splitting Tree which comprises the region of interest. In one embodiment, for example, the medical image provided is a magnetic resonance image of a human brain. Different types of brain tissues are differently contrasted by magnetic resonance imaging. Therefore, brain regions with uniform rescaled image values are expected to be from a single type of brain tissue. As an example, in a preferred embodiment, the magnetic resonance image provided is from human brain, and the following predetermined criteria, Criteria 1 or Criteria 2 are used to terminate the recursive splitting of the sub(sub) images to keep the brain tissue regions of the images functionally meaningful and the size of the Hierarchical Region Splitting Tree small:

Criteria 1: area threshold=50 pixels or approximately 2 ml in volume, (AreaTh=50 pixels or approximately 2 ml in volume); when the individual connected regions for a split image are small (area <50 pixels or approximately 2 ml volume), the rescaled image values are probably from a single brain region; or Criteria 2: standard deviation threshold=10 rscVals (StdDevTh=10 rscVals) and kurtosis threshold=1.5 (KurtTh=1.5); when both the rescaled image values have a low standard deviation (STD <10 rscVals) and the corresponding histogram for a split image has a single very sharp peak (kurtosis <1.5); where the kurtosis image value of a Gaussian Normal distribution is 3, the rescaled image values are probably from a single brain region.

Referring now to FIG. 5, there is shown a diagram of the top levels of a Hierarchical Region Splitting Tree generated by the method of the present invention for a magnetic resonance image which was generated from the histogram of FIG. 2, where the level of image splitting is shown on the right side of the diagram beginning with the first image, Image 0, and the number of each sub-image and the range of rescaled image values (v) present in the sub-image are shown below each sub-image.

In one embodiment, the method further comprises performing a secondary rescaling (a scaling back) of some or all of the rescaled sub-images in the Hierarchical Region Splitting Tree generated from the medical image provided back to the actual image values present in the medical image provided to create secondary rescaled medical images. This secondary rescaling of sub-images generates scaled-back sub-images having the same range of image values as the range of image values present in the medical image provided and can be used to generate a Hierarchical Region Splitting Tree using the actual image values. In one embodiment, the secondary rescaling of each sub-image is performed using a formula that is the counterpart of the formula in the rescaling step, as follows:

actVal=[(rscVal/255)*(maxVal−minVal)]+minVal

According to another embodiment of the present invention, there is provided a method of detecting an abnormality in living human tissue. The method comprises analyzing a medical image according to the present invention, where the medical image comprises a representation of the abnormality in the living human tissue. In one embodiment, the method further comprises quantifying the abnormality in the living human tissue.

When imaged on a magnetic resonance image, injured brain tissues tend to have signal image values in particular magnetic resonance image modalities that are distinct from non-injured brain tissues, and therefore injured brain tissues tend to have good contrast with the adjacent non-injured brain tissues in magnetic resonance images, which makes detection and quantification of injured brain tissues from magnetic resonance images using the present method particularly effective. For example, referring again to FIG. 5, using the method of analyzing a medical image as disclosed in this disclosure, a magnetic resonance image of a living human brain was analyzed and the injured brain region that suffered an ischemic injury was detected as shown in Image 11 in level 2 as a hypo-intense ischemic injury region that is clearly visible in Image 11.

Referring now to FIG. 6, there is shown a block diagram showing some steps in a method according to the present invention of detecting an abnormality in living human tissue using a magnetic resonance image as an example. As can be seen, the method of detecting an abnormality in living human tissue comprises, first, analyzing a medical image as disclosed in this disclosure, where the medical image comprises a representation of the abnormality in the living human tissue. The method of detecting an abnormality in living human tissue will now be disclosed in further detail using a magnetic resonance image as an example of the medical image, and an injury to brain tissue as an example of an abnormality in the living human tissue; however, as will be understood by those with skill in the art with reference to this disclosure, the medical image can be any suitable medical image, such as for example a computed tomography scan (CT scan), a magnetic resonance image (MRI), a positron emission tomography scan (PET scan) and an X-ray, and the abnormality can be any suitable abnormality, such as for example a genetic malformation and an injury.

Next, the method comprises determining an image value (MeanTh) or a set of image values (MeanThs) of actual image values in a medical image (after the secondary rescaling back to the 1 mg image values), where the MeanTh or MeanThs determined identifies the abnormality represented in the medical image, such as a region of brain tissue as injured brain tissue, for the modality being used to generate the medical image provided, where the region of injured brain tissue has an actual image value that is less than the MeanTh, greater than the MeanTh, or within the set of MeanThs, and where the MeanTh(s) comprises a type(s) and an amount(s). The MeanTh(s) are sometimes called a soft threshold image value(s).

In one embodiment, determination of the MeanTh(s) is made before the step of providing the medical image. In another embodiment, determination of the MeanTh(s) is made after the step of providing the medical image. In one embodiment, determining the MeanTh(s) comprises consulting references containing these MeanTh(s), as will be understood by those with skill in the art with reference to this disclosure. In another embodiment, determining the MeanTh(s) comprises performing research to ascertain the MeanTh(s), as will be understood by those with skill in the art with reference to this disclosure. In one embodiment, the medical image is a magnetic resonance image and the modality being used to generate the medical image provided is selected from the group consisting of an apparent diffusion coefficient (ADC) map, and a magnetic susceptibility map and a T2 map, though any suitable modality can be used as will be understood by those with skill in the art with reference to this disclosure. In one embodiment, the type of the MeanTh(s) determined is selected from the group consisting of diffusion coefficient, magnetic susceptibility and T2 relaxation time, though any suitable type of the MeanTh(s) can be used as will be understood by those with skill in the art with reference to this disclosure.

Then, the method comprises selecting a "relational operator" selected from the group consisting of "less than" (the MeanTh), "greater than" (the MeanTh), and "within" (the MeanThs), where the relation operator determined indicates the relationship of the MeanTh(s) determined to the mean of the actual image values in the medical image (the secondarily rescaled image values, that is, the rescaled image values after scaling back to actual image values) of the injured brain tissue for the modality being used to generate the medical image (in this example, a magnetic resonance image) provided. This relationship is used to determine whether the tissues imaged in a sub-image of the medical image constitutes injured brain tissue for the medical image modality being used.

Next, the method comprises comparing the MeanTh(s) to the average image value of each of the scaled-back sub-images of the Hierarchical Region Splitting Tree sequentially starting from the top level (level 0) of the Hierarchical Region Splitting Tree and then downwards through level 1, level 2, and subsequent levels until reaching the first scaled-back sub-image "A" in the Hierarchical Region Splitting Tree that has an average actual magnetic resonance image value that satisfies the relational operator with the MeanTh(s), where the sub-image "A" comprises the abnormality (such as an ischemic injury) in the brain.

For example, from published works, in the modality of an apparent diffusion coefficient (ADC) map for a magnetic resonance image, ischemic injury to the brain has a MeanTh in rescaled apparent diffusion coefficient image value of 80 and a relational operator of "less than." Referring again to FIG. 5, as can be seen, Image '11' has a mean image value (for apparent diffusion coefficient) of 76, an image value that is "less than" the determined MeanTh of 80 and, therefore, Image '11' is detected as comprising an abnormality in the injured living human tissue (here ischemic injured brain tissue). (As can be appreciated, the actual adaptive threshold (95) used to create Image '11' from Image 1 and an actual mean of this image sub-region (76) are different from the MeanTh (80) used to detect the abnormality in the living human tissue.)

For example, in ADC maps (magnetic resonance images) of ischemically-injured brain, when the mean ADC image value of a scaled-back ADC sub-image "A" is "less than" the MeanTh in ADC unit (mm/sec$^2$), that sub-image "A" is delineated as ischemic injury based on the magnetic resonance image modality of diffusion coefficients. Similarly, in T2 maps of ischemically-injured brain, when the mean T2 relaxation time (millisecond) of a scaled-back T2 sub-image "B" is "greater than" the MeanTh (in milliseconds), then sub-image "B" is delineated as ischemic injury based on the magnetic resonance image modality of T2 relaxation time.

When the relational operator is "within," there are two MeanThs, and an injury is determined to be present in the sub-image where the mean actual image value of a scaled-back sub-image is between the two MeanThs. Determination that a scaled-back sub-image is between the two MeanThs (MeanTh1 and MeanTh2) can be made by detecting the first complementary sub image as follows (where MeanTh1=100 and MeanTh2=180 in this example):

a) determining the mask (mask1) of the region for "less than" MeanTh1;
b) determining the mask (mask2) of the region for "greater than" MeanTh2;
c) determining the union of the masks [mask12=AND (mask1, mask2)] from step a) and
d) this is the complementary region of what is being searched;

e) determining the mask (mask0) of the entire brain region from Image '0'; and f) determining the mask of the detected injury region (injuryMask) by subtracting mask12 from mask0 (i.e., mask*=mask0−mask12).

In one embodiment, the method further comprises cleaning the mask of the detected injury region (injuryMask) using morphological opening, closing and cleaning to remove small outlier regions to generate a cleaned injuryMask, as will be understood by those with skill in the art with reference to this disclosure. In another embodiment, the method further comprises using the cleaned injuryMask for further morphological quantifications (such as for example, area/volume, 2D/3D shape, boundary contour/surface, anatomical location, eigenvectors/image values, major/minor axes, orientation, compactness), as will be understood by those with skill in the art with respect to this disclosure.

Referring now to FIG. 7 and FIG. 8, each Figure shows a histogram (left) of a rescaled image (plotting apparent diffusion coefficient rescaled image values in the rescaled image on the x axis versus frequency of each rescaled image value in the rescaled image on the y axis) and the part of the corresponding diagram (right) (Level 0, Level 1 and Level 3) of the levels of a Hierarchical Region Splitting Tree generated by the method of the present invention for a magnetic resonance image which was generated from the histogram (left), where the level of image splitting is shown on the right side of the diagram beginning with the first image, Image 0, and the range of rescaled image values present in the sub-image are shown below each sub-image, where FIG. 7 is generated from the brain of a human neonatal patient with a mild ischemic injury, and FIG. 8 is generated from the brain of a human neonatal patient with a severe ischemic injury. As can be seen, the abnormality is detected in the left-most image of Level 3 in both diagrams because the left-most image of Level 3 is detected as the first sub-image that has a mean scaled-back image value (the scaled-back image value being the same as the original diffusion coefficient image value) that satisfies the relational operator ("less than" in these examples) and the MeanTh (0.16 mm2/sec diffusion for ischemic injury) previously determined.

Referring now to FIG. 9 and FIG. 10, each Figure shows a histogram (left) of a rescaled image (plotting rescaled image values for T2 relaxation time in the rescaled image on the x axis versus frequency of each rescaled image value in the rescaled image on the y axis) and the part of the corresponding diagram (right) (Level 0, Level 1 and Level 2) of the levels of a Hierarchical Region Splitting Tree generated by the method of the present invention for a magnetic resonance image which was generated from the histogram (left), where the level of image splitting is shown on the right side of the diagram beginning with the first image, Image 0, and the range of rescaled image values present in the sub-image are shown below each sub-image, where FIG. 9 is generated from a rat brain with a mild ischemic injury, and FIG. 10 is generated from a rat brain with a severe ischemic injury. As can be seen, the abnormality is detected in the right image of Level 1 in both diagrams because the right image of Level 1 is detected as the first sub-image that has a mean scaled-back image value (the scaled-back image value being the same as the original T2 relaxation time image value) that satisfies the relational operator ("greater than" in these examples) and the MeanTh (180 millisecond T2 relaxation time for ischemic injury) previously determined.

Referring now to FIG. 11, there is shown a diagram comparing volumetric results of magnetic resonance images of injured brains using methods according to the present invention (HRS) and using standard manual methods at different injury-severities. T2WI from mild (<15% lesion), moderate (15-35%) and severe (>35%) injuries are shown at the level of the horizontal line. The percentage of the lesion volume compared to the entire brain is shown below the 3D volumes. As can be seen, manually detected lesions in 2D (T2WI, row 1) and in 3D (row 2) and lesions detected according to the present invention (HRS) in 2D (T2WI, row 3) and in 3D (row 4) were similar between both methods, demonstrating that results using the present method (HRS) correlated accurately with results using the standard manual method.

According to another embodiment of the present invention, there is provided a method of detecting a core of an injury and detecting a penumbra of an injury in living human tissue, and distinguishing the core from the penumbra. The method comprises analyzing the medical image according to the present invention. In one embodiment, the human tissue is selected from the group consisting of heart, intestines, joints, kidneys, liver, lungs and spleen, though any suitable tissue can be used as will be understood by those with skill in the art with reference to this disclosure. In a preferred embodiment, the living human tissue is brain. The method will now be disclosed in greater detail with reference to magnetic resonance imaging of the living human brain as an example of the method, though corresponding steps can be used with other types of medical images and other types of human tissue, as will be understood by those with skill in the art with reference to this disclosure.

The "core" of an injury is the area or volume that contains tissues that are dead and completely irrecoverable. The "penumbra" of an injury is the area or volume that contains tissue that is not dead but that is affected by the injury, where some of the tissue is recoverable. The penumbra is generally located adjacent to or around the core. Outside of the core and penumbra are normal healthy tissues. The water content (such as for example as determined by T2 maps) and water mobility (such as for example as determined by apparent diffusion coefficient maps) in magnetic resonance images are generally different for the core as compared to the penumbra, and the water content and water mobility in magnetic resonance images are generally different for both the core and the penumbra as compared to normal healthy tissues.

In one embodiment, the method according to the present invention of detecting a core of an injury and detecting a penumbra of an injury in living human tissue, and distinguishing the core from the penumbra is accomplished by:

a) detecting one sub(sub) image (designated the "injury sub-image") comprising the region of interest in the terminated Hierarchical Region Splitting Tree, where the region of interest represents the injury according to the present invention;

b) determining the mask of the injury ("InjuryMask");

c) determining a sub-tree below the detected injury sub-image using the injury sub-image as the root of the sub-tree;

d) determining the MeanThs (soft threshold image values), here referred to as the "MeanThPnmb," which is the image value for separating the core from the penumbra by determining the water content (such as for example as determined by T2 maps) and water mobility (such as for example as determined by apparent diffusion coefficient maps) in magnetic resonance images associated with the core and the penumbra of a particular type of injury from published sources or from expert knowledge;

e) comparing the MeanThPnmb inside the sub-tree to find the penumbra and the mask of the penumbra ("PnmbMask"); and determining the mask of the core ("Core- Mask") by subtracting the PnmbMask from InjuryMask (that is, the CoreMask=the InjuryMask–the Pnmb-Mask). (Shown in red regions in FIG. 12 and FIG. 13 where the Figures are in color and in the lighter gray where the Figures are not in color).

For example, referring again to FIG. 5, Image 11 is the injury sub-image and the sub-tree is Image 111 and Image 112 (as shown in FIG. 5), and sub-images below Image 111 and Image 112 (that are not shown in FIG. 5). Known T2 relaxation time image values for neonatal ischemic injury are greater than 200 ms for the core, and 160 ms<T2 relaxation time <200 ms for the penumbra, and known apparent diffusion coefficient is less than $0.25 \times 10^{-3}$ mm$^2$/sec for the core and $0.25 \times 10^{-3}$ mm$^2$/sec<apparent diffusion coefficient <$0.50 \times 10^{-3}$ mm$^2$/sec for the penumbra. Hence, using the image values in step c) and the mean T2 relaxation time ("meanT2") and/or mean apparent diffusion coefficient ("meanADC") of a sub-image in the sub-tree from step b), the penumbra is decided by meanT2<MeanThPnmb=200 ms, and by apparent diffusion coefficient meanADC>MeanThPnmb=$0.25 \times 10^{-3}$ mm$^2$/sec.

In one embodiment, the method further comprises determining different gradations (quantitative measures) of the core and the penumbra using steps corresponding to other embodiments of the method disclosed in this disclosure as will be understood by those with skill in the art with reference to this disclosure. The different quantitative measures of the core and the penumbra are useful for better pathological temporal monitoring and therapeutic intervention, even if there is no scientific term yet associated with the quantitative measures (such as core and penumbra). In summary, the corresponding steps for determining the different gradations of the core and penumbra are as follows:
   a) providing the sub-tree of the HRS tree;
   b) identifying small ranges in-between the entire signal range of the injury sub-image in the root image that correspond to corresponding gradations of the core and penumbra; and
   c) computing the different gradations.

In one embodiment, the method further comprises clustering multiple sub-images with the same range (from different branches and different levels of the HRS tree) to get unified sub-region structures of the injury.

Referring now to FIG. 12, there is shown a diagram of core-penumbra injury detected according to the present invention in an animal brain. As can be seen, using the present method, core was detected as red areas in row 2, and penumbra was detected as blue areas in row 2 using T2 maps (row 1). Further, using the present method, even finer gradations of the injury beyond the simple core-penumbra separation were identified in row 3, where the red: T2>220; magenta: 200<T2<220; yellow: 190<T2<200; blue: 180<T2<190; cyan: 170<T2<180; green: 150<T2<170; and white: 140<T2<150 visually depict the finer gradations, where the Figures are in color and in varying shades of gray where the Figures are not in color.

Referring now to FIG. 13, there is shown a diagram of core-penumbra injury detected according to the present invention in a human neonatal brain. As can be seen, using the present method, core was detected as red areas and penumbra as blue areas in row 2 and row 5 using apparent diffusion coefficient maps (row 1 and row 4). Further, using the present method, even finer gradations of the injury beyond meanADC is mean apparent diffusion coefficient of a sub-image in the sub-tree from step a) above and pseudo-colors used to visualize the finer gradation are as follows:
   a) red: meanADC<$0.10 \times 10^{-3}$ mm$^2$/sec;
   b) magenta: $0.10 \times 10^{-3}$ mm$^2$/sec<meanADC<$0.20 \times 10^{-3}$ mm$^2$/sec;
   c) yellow: $0.20 \times 10^{-3}$ mm$^2$/sec<meanADC<$0.25 \times 10^{-3}$ mm$^2$/sec;
   d) blue: $0.25 \times 10^{-3}$ mm$^2$/sec<meanADC<$0.30 \times 10^{-3}$ mm$^2$/sec;
   e) cyan: $0.30 \times 10^{-3}$ mm$^2$/sec<meanADC<$0.35 \times 10^{-3}$ mm$^2$/sec;
   f) green: $0.35 \times 10^{-3}$ mm$^2$/sec<meanADC<$0.40 \times 10^{-3}$ mm$^2$/sec; and
   g) white: $0.40 \times 10^{-3}$ mm$^2$/sec<meanADC<$0.50 \times 10^{-3}$ mm$^2$/sec.
where the Figures are in color and in varying shades of gray where the Figures are not in color. The same techniques and range of image values are used for FIGS. 12 and 13, where only finer gradations of the injury are shown for an injured animal brain and injured human brain, respectively.

As will be understood by those with skill in the art with reference to this disclosure, injuries usually evolve spatially and temporally as does many other types of abnormalities such as genetic abnormality, that is, the anatomical location and extent of an injury changes over time after the injury and usually involve an initial degeneration process followed by a recovery process. According to one embodiment of the present invention, there is provided a method of quantifying the spatiotemporal evolution of an injury in living human tissue. In one embodiment, the method comprises:
   a) using an established (preferably age-matched) atlas of the injured tissue, such as for example an atlas of injured brain, and a standard (manual or automatic) co-registration method to overlap the two-dimensional or three-dimensional magnetic resonance image onto the two-dimensional or three-dimensional atlas of the injured tissue;
   b) determining the anatomical regions involved in the injury at different granular levels (such as for example the entire injured region, the core and penumbra, or finer gradations of the injured region);
   c) quantifying different features specific to the spatial overlaps; and
   d) using longitudinal imaging data (such as for example neuro-imaging data in the case of brain injury) to reveal temporal variations of the spatial features in the quantifying step.

By way of example only, such quantifying of the spatiotemporal evolution of an injury comprises quantifying the mean T2 image value of the injured tissues over time, how the volume of an injury changes over time, and how an injured tissue recovers over time.

According to another embodiment of the present invention, there is provided a method of detecting the effects of endogenous or implanted stem cells (such as for example neuronal stem cells (NSCs)) on living human tissue. In one embodiment, the method involves the automated detection and quantitative monitoring of stem cells. Stem cells that have been labeled with iron are visible on various medical imaging techniques, such as for example on magnetic resonance images in the modality of T2 maps and susceptibility weighted imaging (SWI) maps where the iron labeled stem cells appear as dark (hypo-intense) small clusters on the magnetic resonance image. Markers other than iron that allow stem cells to be distinguished from surrounding tissues are also useful for this method, as will be understood by those with skill in the art with reference to this disclosure. In the present invention, the methods disclosed in this disclosure are used to monitor labeled stem cells. In one embodiment, the method comprises:

a) determining the magnetic resonance image values of the labeled and implanted stem cells, such as for example using the published work or original research. For example, in T2 maps, iron labeled neuronal stem cells outside of an injury usually have pixels/voxels with a T2 relaxation time of less than 50 ms (that is, the soft approximate threshold in T2 maps for iron labeled neuronal stem cells is MeanThNSCout=50 ms for iron labeled neuronal stem cells detection). Alternately, iron labeled neuronal stem cells inside an injury can be different from iron labeled neuronal stem cells outside of the injury due to superimposition of injury-contrast and iron labeled neuronal stem cells-contrast and voxel-averaging effect in the magnetic resonance image, where ischemic injuries are bright (hyper-intense) and iron-labeled NSCs are dark (hypo-intense) in T2 maps. Hence, the corresponding approximate threshold the "MeanTh NSCin" is determined by the equation:

$$\mathrm{mean}ThNSC\mathrm{in}=\mathrm{mean}ThNSC\mathrm{out}/\mathrm{meanNABM}*\mathrm{meanInjury}$$

where "meanNABM" and "meanInjury" are the actual mean T2 image values of the normal area brain matter (NABM) and the injury, respectively. This assumes that the contrast ratio between iron-labeled neuronal stem cells and the surrounding tissues are same in T2 maps, whether the neuronal stem cells are outside of or inside the injury.

b) Neuronal Stem Cells Detection Outside Injury: From the Hierarchical Region Splitting Tree generated according to the present invention, the sub-regions with a mean MRI image value less than MeanThNSC1 are found, and the mask of the detected stem cells (nscMask) is found, again according to the present invention. Referring now to FIG. 14, there is shown a diagram depicting the detection of iron-labeled stem cells in an ischemic animal brain over four weeks, where red is the ischemic lesion, yellow is the iron-labeled murine neuronal stem cells, where the Figures are in color and in varying shades of gray where the Figures are not in color. As can be seen, the iron labeled neuronal stem cells were detected in the left-most strand (containing sub-images '0'-'1'-'11'-'111'-'1111'- and so on) of the T2-map-based Hierarchical Region Splitting Tree near the bottom of the entire tree (the entire HRS tree is not shown).

c) Neuronal Stem Cells Detection Inside Injury: In this case, HRS sub-tree is considered below the detected injury in the magnetic resonance image, such as in T2 maps, and the sub-region of the detected injury (injuryMask) is found that has mean magnetic resonance image value less than the approximate threshold "MeanThNSCin." This sub-region of the injury is identified as neuronal stem cells inside the injury. In general, the neuronal stem cell regions are found at the left-most strand of the sub-tree with detected injury as the root.

d) quantify different features morphological quantifications of the "nscMask." In a preferred embodiment, no morphological cleaning is done as neuronal stem cells clusters are sometimes very small in size. In one embodiment, the feature quantified is selected from the group consisting of (actual) mean, anatomical location, area/volume, 2D/3D shape, compactness, standard deviation and weighted centroid.

Stem cells are attracted by signals from an injury region and the stem cells migrate, proliferate, differentiate and take part in recovery from the injury, including injury to the brain. Quantification of the stem cells' activities (in vivo) is currently performed by time-consuming and subjective visual/manual methods. According to another embodiment of the present invention, there is provided a method of quantifying spatiotemporal activities of implanted labeled stem cells in living human tissue, including human brain. In one embodiment, the method comprises steps corresponding to steps from methods disclosed in this disclosure. In summary, shape, proximity and area-similarity based matching is done to track specific stem cells cluster over space and time. Migrations of stem cells are computed by location changes of the magnetic resonance image-signal-weighted centroid of the same stem cells cluster over time. Direction, speed or both direction and speed can be determined. Proliferations of stem cells are computed by the expansion and compression of the area or volume of a particular stem cells cluster, where directional preferences in proliferation are computed by changing shapes over time. Higher order statistics of the migration and proliferation (such as for example rate of change of migration and rate of change of proliferation) are also computed for detailed stem cells activities. Final locations of the stem cells are computed by determining the "leading edge," that is, the farthest pixel/voxel of the stem cells cluster from the implantation site. As different stem cells clusters take different paths towards the injury site, path-specific stem cells activities are quantified and compared for to allow monitoring of stem cell therapy.

According to another embodiment of the present invention, there is provided a method of quantifying the interaction between injury evolution and stem-cell activities in living human tissue, including human brain. In one embodiment, the method comprises steps corresponding to steps from methods disclosed in this disclosure.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. A method of analyzing a medical image, the medical image comprising one or more than one region of interest, the method comprising:
   a) providing the medical image comprising a set of actual image values;
   b) rescaling the actual image values to produce corresponding rescaled image values and to produce a rescaled image from the rescaled image values;
   c) deriving a histogram of the rescaled image values;
   d) using the histogram to derive an adaptive segmentation threshold that can be used to split the rescaled image into two sub-images, a first sub-image with intensities at or below the adaptive segmentation threshold and a second sub-image with intensities above the adaptive segmentation threshold, or a first sub-image with intensities below the adaptive segmentation threshold and a second sub-image with intensities at or above the adaptive segmentation threshold, or a first sub-image with intensities below the adaptive segmentation threshold and a second sub-image with intensities above the adaptive segmentation threshold;
   e) using the adaptive segmentation threshold to recursively split the rescaled image to generate a Hierarchical Region Splitting Tree of sub(sub) images based on consistency of the rescaled image values of the rescaled image;

f) terminating the recursive splitting of the sub(sub) images using one or more than one predetermined criteria thereby completing the Hierarchical Region Splitting Tree; and g) identifying one sub(sub) image in the terminated Hierarchical Region Splitting Tree which comprises the region of interest;

the method further comprising performing a secondary rescaling of the rescaled image values of every rescaled sub(sub) image in the Hierarchical Region Splitting Tree back to the actual image values present in the medical image to create a secondary rescaled medical image, thereby producing a secondarily rescaled sub(sub) image comprising the region of interest;

where the rescaled image values fit in [0,255] unsigned 8-bit integer range;

where the predetermined criteria is selected from the group consisting of area threshold=50 pixels and (standard deviation threshold=10 rscVals (StdDevTh=10 rscVals) and kurtosis threshold=1.5);

where the region of interest is a representation of an abnormality in the living human tissue, and where the method further comprises quantifying the abnormality in the living human tissue;

where the method further comprises performing a secondary rescaling of the rescaled image values in every rescaled sub(sub) image in the Hierarchical Region Splitting Tree back to the actual image values present in the medical image to create a secondary rescaled medical image, and determining an image value or a set of image values of actual image values in the medical image after the secondary rescaling, where the image value or a set of image values of actual image values determined identifies the abnormality represented in the medical image for the modality being used to generate the medical image provided; and where the method further comprises preparing a mask of the sub(sub) image containing the representation of the abnormality, and cleaning the mask to remove small outlier regions to generate a cleaned mask of the sub(sub) image containing the representation of the abnormality.

2. The method of claim 1, where the one sub(sub) image in the terminated Hierarchical Region Splitting Tree comprising the region of interest is two-dimensional.

3. The method of claim 1, where the secondarily rescaled sub(sub) image in the terminated Hierarchical Region Splitting Tree comprising the region of interest is three-dimensional.

4. The method of claim 1, where the secondarily rescaled one sub(sub) image in the terminated Hierarchical Region Splitting Tree comprising the region of interest is two-dimensional.

5. The method of claim 1, where the one sub(sub) image in the terminated Hierarchical Region Splitting Tree comprising the region of interest is three-dimensional.

6. The method of claim 1, where the medical image is selected from the group consisting of a computed tomography scan, a magnetic resonance image, a positron emission tomography scan and an X-ray.

7. The method of claim 1, where the one sub(sub) image in the terminated Hierarchical Region Splitting Tree comprising the region of interest is two-dimensional.

8. The method of claim 1, where the one sub(sub) image in the terminated Hierarchical Region Splitting Tree comprising the region of interest is three-dimensional.

9. The method of claim 1, where the region of interest is a representation of an injury to living human tissue and the method detects the representation of the injury.

10. The method of claim 9, where the method qualifies the representation of the injury.

11. The method of claim 1, where the medical image is of human tissue selected from the group consisting of brain, heart, intestines, joints, kidneys, liver, lungs and spleen.

12. The method of claim 1, where the medical image provided is in a hard copy form, and where the method further comprises preparing a digital form of the medical image before providing the medical image.

13. The method of claim 1, where the abnormality is selected from the group consisting of a genetic malformation and an injury.

14. The method of claim 1, where determining the image value or a set of image values of actual image values is made before the step of providing the medical image.

15. The method of claim 1, where determining the image value or a set of image values of actual image values is made after the step of providing the medical image.

16. The method of claim 1, where the medical image is a magnetic resonance image and the modality being used to generate the medical image provided is selected from the group consisting of an apparent diffusion coefficient map, a magnetic susceptibility map and a T2 map.

17. A method of detecting a core of an injury and detecting a penumbra of an injury in living human tissue, and distinguishing the core from the penumbra, the method comprising:

a) detecting one sub(sub) image (the injury sub-image) in the terminated Hierarchical Region Splitting Tree comprising the region of interest according to claim 1, where the region of interest represents the injury;

b) determining the mask of the injury;

c) determining a sub-tree below the detected injury sub-image using the injury sub-image as the root of the sub-tree;

d) determining soft threshold image values for separating the core from the penumbra;

e) comparing the soft threshold image values inside the sub-tree to find the penumbra and a mask of the penumbra; and f) determining the mask of the core by subtracting the mask of the penumbra from the mask of the injury.

18. The method of claim 17, further comprising determining different gradations of the core and the penumbra.

19. The method of claim 1, further comprising quantifying the spatiotemporal evolution of an injury in living human tissue.

20. A method of detecting the effects of endogenous or implanted stem cells on living human tissue, the method comprising:

a) determining magnetic resonance image values of labeled and implanted stem cells;

b) detecting the stem cells outside of the region of interest using a method according to claim 1; and c) detecting the stem cells inside of the region of interest using a method according to claim 1.

21. The method of claim 19, further comprising quantifying spatiotemporal activities of implanted labeled stem cells in the living human tissue.

22. A method of analyzing a medical image, the medical image comprising one or more than one region of interest, the method comprising:
- a) configuring at least one processor to perform the functions of:
  1) providing the medical image comprising a set of actual image values;
  2) rescaling the actual image values to produce corresponding rescaled image values and to produce a rescaled image from the rescaled image values;
  3) deriving a histogram of the rescaled image values;
  4) using the histogram to derive an adaptive segmentation threshold that can be used to split the rescaled image into two sub-images, a first sub-image with intensities at or below the adaptive segmentation threshold and a second sub-image with intensities above the adaptive segmentation threshold, or a first sub-image with intensities below the adaptive segmentation threshold and a second sub-image with intensities at or above the adaptive segmentation threshold, or a first sub-image with intensities below the adaptive segmentation threshold and a second sub-image with intensities above the adaptive segmentation threshold;
  5) using the adaptive segmentation threshold to recursively split the rescaled image to generate a Hierarchical Region Splitting Tree of sub(sub) images based on consistency of the rescaled image values of the rescaled image;
  6) terminating the recursive splitting of the sub(sub) images using one or more than one predetermined criteria thereby completing the Hierarchical Region Splitting Tree; and
  7) identifying one sub(sub) image in the terminated Hierarchical Region Splitting Tree which comprises the region of interest;

the method further comprising performing a secondary rescaling of the rescaled image values of every rescaled sub(sub) image in the Hierarchical Region Splitting Tree back to the actual image values present in the medical image to create a secondary rescaled medical image, thereby producing a secondarily rescaled sub(sub) image comprising the region of interest;

where the rescaled image values fit in [0,255] unsigned 8-bit integer range;

where the predetermined criteria is selected from the group consisting of area threshold=50 pixels and (standard deviation threshold=10 rscVals (StdDevTh=10 rscVals) and kurtosis threshold=1.5);

where the region of interest is a representation of an abnormality in the living human tissue, and where the method further comprises quantifying the abnormality in the living human tissue;

where the method further comprises performing a secondary rescaling of the rescaled image values in every rescaled sub(sub) image in the Hierarchical Region Splitting Tree back to the actual image values present in the medical image to create a secondary rescaled medical image, and determining an image value or a set of image values of actual image values in the medical image after the secondary rescaling, where the image value or a set of image values of actual image values determined identifies the abnormality represented in the medical image for the modality being used to generate the medical image provided;

where the medical image is a magnetic resonance image and the modality being used to generate the medical image provided is selected from the group consisting of an apparent diffusion coefficient map, a magnetic susceptibility map and a T2 map; and where the method further comprises preparing a mask of the sub(sub) image containing the representation of the abnormality, and cleaning the mask to remove small outlier regions to generate a cleaned mask of the sub(sub) image containing the representation of the abnormality.

23. The method of claim 22, where the one sub(sub) image in the terminated Hierarchical Region Splitting Tree comprising the region of interest is two-dimensional.

24. The method of claim 22, where the secondarily rescaled sub(sub) image in the terminated Hierarchical Region Splitting Tree comprising the region of interest is three-dimensional.

25. The method of claim 22, where the secondarily rescaled one sub(sub) image in the terminated Hierarchical Region Splitting Tree comprising the region of interest is two-dimensional.

26. The method of claim 22, where the one sub(sub) image in the terminated Hierarchical Region Splitting Tree comprising the region of interest is three-dimensional.

27. The method of claim 22, where the medical image is selected from the group consisting of a computed tomography scan, a magnetic resonance image, a positron emission tomography scan and an X-ray.

28. The method of claim 22, where the one sub(sub) image in the terminated Hierarchical Region Splitting Tree comprising the region of interest is two-dimensional.

29. The method of claim 22, where the one sub(sub) image in the terminated Hierarchical Region Splitting Tree comprising the region of interest is three-dimensional.

30. The method of claim 22, where the region of interest is a representation of an injury to living human tissue and the method detects the representation of the injury.

31. The method of claim 30, where the method qualifies the representation of the injury.

32. The method of claim 22, where the medical image is of human tissue is selected from the group consisting of brain, heart, intestines, joints, kidneys, liver, lungs and spleen.

33. The method of claim 22, where the medical image provided is in a hard copy form, and where the method further comprises preparing a digital form of the medical image before providing the medical image.

34. The method of claim 33, where the abnormality is selected from the group consisting of a genetic malformation and an injury.

35. The method of claim 33, where determining the image value or a set of image values of actual image values is made before the step of providing the medical image.

36. The method of claim 33, where determining the image value or a set of image values of actual image values is made after the step of providing the medical image.

37. The method of claim 33, where the medical image is a magnetic resonance image and the modality being used to generate the medical image provided is selected from the group consisting of an apparent diffusion coefficient map, a magnetic susceptibility map and a T2 map.

* * * * *